United States Patent [19]

Frey et al.

[11] Patent Number: 5,390,328
[45] Date of Patent: Feb. 14, 1995

[54] DATA PROCESSING SYSTEM AND METHOD FOR PROVIDING NOTIFICATION IN A CENTRAL PROCESSOR OF STATE CHANGES FOR SHARED DATA STRUCTURE ON EXTERNAL STORAGE

[75] Inventors: Jeffrey A. Frey, Fishkill; Audrey A. Helffrich, Poughkeepsie; Jeffrey M. Nick, Fishkill; Michael D. Swanson, Poughkeepsie, all of N.Y.

[73] Assignee: International Business Machines Corporation, Armonk, N.Y.

[21] Appl. No.: 860,809

[22] Filed: Mar. 30, 1992

[51] Int. Cl.⁶ .................... G06F 13/00; G06F 9/46
[52] U.S. Cl. .................... 395/650; 364/DIG. 2; 364/940; 364/942.5; 364/946.7; 364/284; 364/264.6
[58] Field of Search ............ 395/650, 200, 600

[56] References Cited
U.S. PATENT DOCUMENTS 4,399,504  8/1983  Obermarck et al. ......... 364/DIG. 1
4,543,626  9/1985  Bean et al. ................. 364/DIG. 1
4,851,988  7/1989  Trottier et al. .............. 395/200
5,008,853  4/1991  Bly et al. .................... 364/DIG. 2

Primary Examiner—Eddie P. Chan
Attorney, Agent, or Firm—Lynn L. Augspurger; William B. Porter

[57] ABSTRACT

Two or more user applications executing on one or more processors, each controlled by an operating system, share use of a list structure within a Structured External Storage (SES) facility to which each processor is connected. One of the applications registers interest in particular state transitions affecting one or more lists within the list structure, causing a process within the SES to notify the appropriate processor when a list operation causes the particular state transition, without interrupting processing on the processor. The application receives notice of the state transition by periodically polling a vector within the processor, or by receiving control when a test by the operating system of a summary indicator for the vector causes an application exit to be driven.

22 Claims, 21 Drawing Sheets

FIG. 4B

REQUEST OPERANDS 402

| | | | |
|---|---|---|---|
| LEID-404 | LEK-428 | ETELR-461 | TDIR-478 |
| LEN-405 | ELT-429 | LELX-462 | MELT-479 |
| DIR-406 | LC-433 | SID-465 | DBS-4A3 |
| VN-411 | ALE-434 | SS-466 | RT-4A4 |
| LRT-412 | LET-435 | USC-467 | SDI-4A8 |
| LLB-413 | DLES-436 | LCT-468 | EDI-4A9 |
| LTEN-414 | MDLES-437 | LECL-469 | LELCL-4AA |
| CGLM-415 | KRT-439 | ULC-472 | RLT-4AB |
| LLM-416 | DELT-440 | UAC-475 | RX-4AC |
| UID-418 | LNT-441 | | RVN-4AD |
| WRT-420 | LNEN-442 | | |
| CVN-421 | NESC-443 | | |
| VRT-422 | SU-444 | | |
| LN-423 | LNRT-445 | | |
| LTEX-425 | LST-447 | | |
| LTEC-427 | TLEK-452 | | |
| | TLN-453 | | |

FIG. 4C

RESPONSE OPERANDS 403

| | | |
|---|---|---|
| RC-407 | MLSEC-480 | RVN-4A0 |
| VN-408 | MLSELC-481 | ALE-4A1 |
| LEID-410 | SS-482 | RLEC-4A2 |
| UID-419 | LST-483 | RT-4A5 |
| LN-430 | LTEX-484 | DLEC-4A7 |
| LTEN-431 | LELX-485 | CDI-4B0 |
| LEC-446 | ETELR-486 | LELC-4B2 |
| LEN-448 | LTEC-487 | LSTC-4B1 |
| LEK-449 | LC-488 | MDLES-4B3 |
| DLES-451 | LSELC-490 | LELCL-4B4 |
| LTE-455 | NLTEC-491 | |
| SI-456 | LSEC-492 | |
| LECL-459 | USC-494 | |
| | UIDV-495 | |
| | ULC-497 | |
| | UAC-499 | |

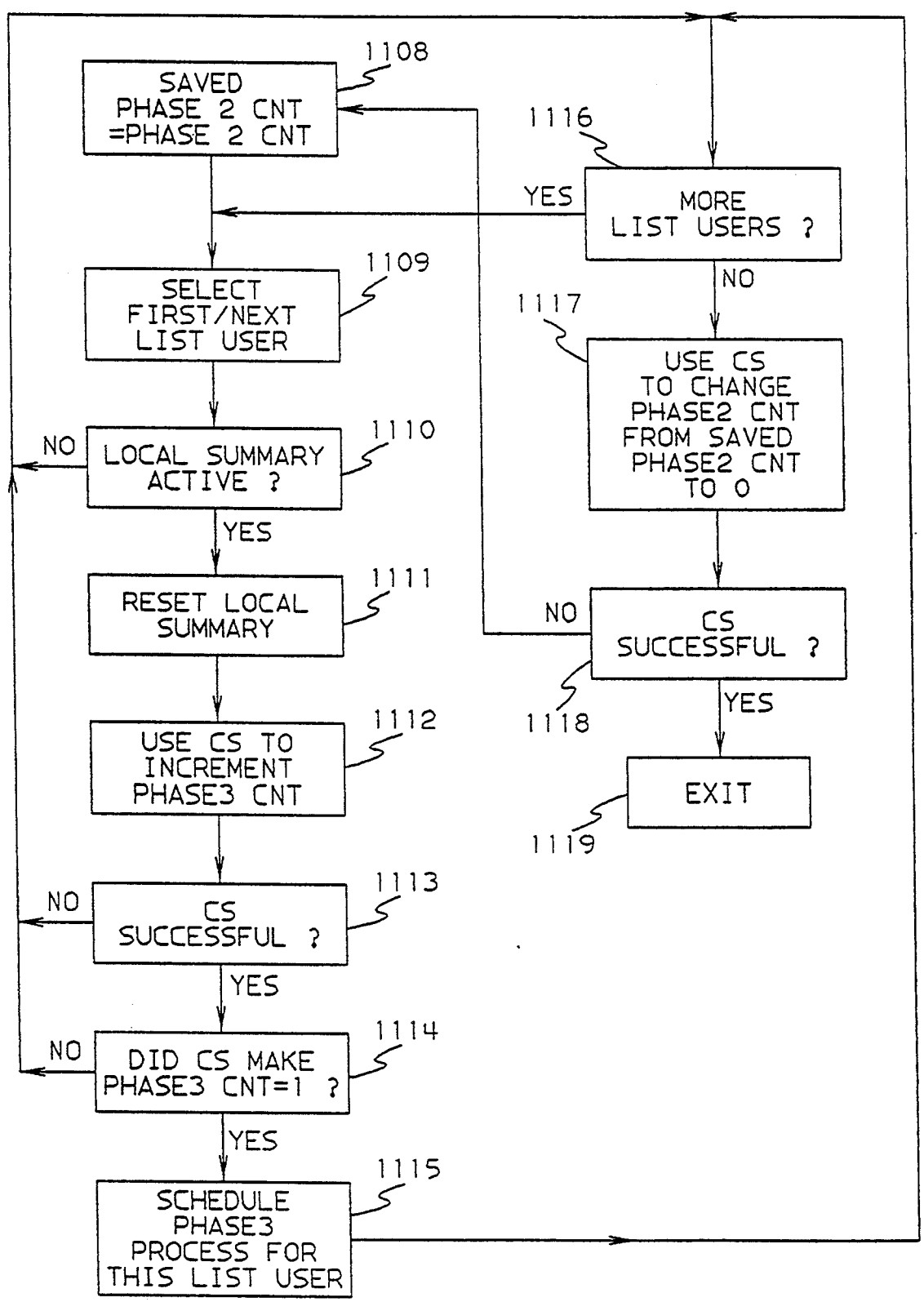

DATA PROCESSING SYSTEM AND METHOD FOR PROVIDING NOTIFICATION IN A CENTRAL PROCESSOR OF STATE CHANGES FOR SHARED DATA STRUCTURE ON EXTERNAL STORAGE

CROSS REFERENCE TO RELATED APPLICATIONS

This application contains subject matter which is related to the subject matter of the following applications which are assigned to the same assignee as this application. They are hereby incorporated by reference:

"Configurable, Recoverable Parallel Bus" by N. G. Bartow et al, Ser. No. 07/839,657, (Docket No. PO991066), Filed: Feb. 20, 1992; continuation Ser. No. 08/071,146, (Docket No. PO9-91-066X), filed Jun. 1, 1993; "High Performance Intersystem Communications For Data Processing Systems" by N. G. Bartow et al, Serial Number , (Docket No. PO991067), Filed: Feb. 20, 1992; and "Frame-Group Transmission And Reception For Parallel/Serial Buses", U.S. Pat. No. 5,267,240, issued Nov. 30, 1993.

The subject matter in the following listed applications is also related to and is hereby incorporated by reference in present application. Each of the following listed applications is owned by the same assignee as the present application, is filed on the same day as the present application, and has the same priority date as the present application. They are:

"Communicating Messages Between Processors And A Coupling Facility" by D. A. Elko et al, Ser. No. 07/860,380, (Docket Number PO991006); "Sysplex Shared Data Coherency Method and Means" by D. A. Elko et al, Ser. No. 07/860,805, (Docket Number PO991052); "Method and Apparatus For Distributed Locking of Shared Data, Employing A Central Coupling Facility" by D. Elko, et al., Ser. No. 07/860,808, now U.S. Pat. No. 5,339,427, (Docket Number PO991059); "Command Quiesce Function" by D. A. Elko et al, Ser. No. 07/860,330, now U.S. Pat. No. 5,339,405, (Docket No. PO991062); "Storage Management For A Shared Electronic Storage Cache" by D. A. Elko et al, Ser. No. 07/860,807, (Docket Number PO991078); "Management Of Data Movement From A SES Cache To DASD" by D. A. Elko et al, Ser. No. 07/860,806, (Docket Number PO991079); "Command Retry System" by D. A. Elko et al, Ser. No. 07/860,378, (Docket Number PO992002); "Integrity Of Data Objects Used To Maintain State Information For Shared Data At A Local Complex" by D. A. Elko et al, Ser. No. 07/860,800, (Docket Number PO992003); "Management Of Data Objects Used To Maintain State Information For Shared Data At A Local Complex" by J. A. Frey et al, Ser. No. 07/860,797, (Docket Number PO992004); "Recovery Of Data Objects Used To Maintain State Information For Shared Data At A Local Complex" by J. A. Frey et al, Ser. No. 07/860,647, (Docket Number PO992005); "Message Path Mechanism For Managing Connections Between Processors And A Coupling Facility" by D. A. Elko et al, Ser. No. 07/860,646, (Docket Number PO992006); "Method And Apparatus For Performing Conditional Operations on Externally Shared Data" by J. A. Frey, et al., Ser. No. 07/860,655, (Docket Number PO992008); "Apparatus And Method For List Management In A Coupled DP System" by J. A. Frey, et al. Ser. No. 07/860,633, (Docket Number PO992009); and "Interdicting I/O And Messaging Operations In A Multi-System Complex" by D. A. Elko, et al., Ser. No. 07/860,489, (Docket Number PO992010); "Method and Apparatus for Coupling Data Processing Systems" by D. A. Elko, et al., Ser. No. 07/860,803, (Docket Number PO9-92-012).

BACKGROUND OF THE INVENTION

The invention relates to general purpose computer applications which share data in a single or multi-system configuration (a SYSPLEX). More specifically, it relates to the managing of shared lists of data in a separate facility which is coupled to each of the computer systems, and where the separate facility detects the changes of a list to an empty or a not-empty state, and notifies interested applications on the computer systems in the coupled configuration about the state-transitions.

Queueing or message passing as a general concept is basic to many programming protocols. A list of objects is a convenient means of representing work requests between a client and a server. The server is responsible to remove a work object from the list, service the request and send the response back to the client indicating the service has been completed. The response may be presented to the client by placing a response object on a list processed by the client. In such a client-server system, the server accepts and processes requests until all requests have been processed and the list of service requests is exhausted. Typically, when the list of requests is exhausted, the server enters a wait state or performs lower priority work until notification is received indicating additional requests have been placed on the list for service.

In multiprocessing and coupled systems environments, the list, or queue, of work objects, and response objects, are processed by a multiplicity of processes (programs) which may operate in one or more Central Processor Complexes (CPCs). The lists must be accessible by each of the processes, resulting in problems of coordination among the processes.

These problems grow in environments where two or more CPCs are each remotely coupled to a shared external memory containing queues of work and response objects. The delay and overhead involved in accessing the lists put a high premium on minimizing accesses to the external memory, as well as minimizing interprocessor communication required for coordination.

Exemplary of these problems is the problem of reducing or eliminating remote requests by a process directed toward a list which is empty. Processes which rely on "polling" techniques—developed to accommodate local queue environments where the costs of periodic polling are low—will suffer unacceptable performance penalties if polling must be done to an external device, and a substantial likelihood exists that a queue may be empty.

In order to reduce this overhead, techniques have been developed by which a remote client or server is notified when a queue becomes empty (so that polling can be suspended), or transitions from an empty to non-empty state (so that polling can be resumed). Typically, such notification is done in static, or tightly controlled environments, where the association between the queue and the process interacting with the queue is known, so that determination of which processor to signal is simple. Additionally, such systems must contend with the overhead within the systems containing client or server processes of being interrupted when such notifications are received, and handling the notification in an appropriately serialized manner if multiple processes are to execute in parallel. Again, such difficulties may severely restrict the operating environments which can accommodate such notification schemes.

It is an object of the present invention to provide an improved mechanism, with low overhead and data integrity, for providing notification of state transition (empty to non-empty, or non-empty to empty) of list structures on a shared storage device, to processes executing on remote processors, and accessing the list structures.

It is a further object of this invention to provide a mechanism whereby a process executing on a general-purpose system may initiate and terminate notification of state transitions involving a particular list on a shared external storage device, with minimal disruption of other work executing on the same system.

It is another object of this invention to minimize communication required between systems executing in a Systems Complex (Sysplex) to effect the sharing of a remote list of work objects among client/server processes executing on the systems.

SUMMARY OF THE INVENTION

One or more systems executing on one more Central Processing Complexes (CPCs) are grouped together in a coupled configuration (a SYSPLEX); and are also coupled to a separate, Structured External Storage facility (SES) which manages lists of data which are shared among the CPCs in the coupled configuration.

The SES facility maintains structures of list objects which reside in the SES, and provides operations (or commands) which represent requests for the SES facility to perform one or more of its management functions on the list structures.

These commands permit programmed applications that reside on the CPCs to:
 Allocate list structure on the SES,
 Identify themselves as users of a list structure,
 Indicate their interest in being notified when a specified list enters the empty or not-empty state, and
 Read, Create, Delete, Replace and Move data to or from the lists that reside in the SES facility.

Notification of state changes (list-state transitions) is initiated by a list-notification command sent by the SES facility and is an unsolicited communication to the CPC of each user having an interest in the list. This communication is directed to a second separate facility at each CPC. This separate facility is called the SES Support Facility, and it responds to the list-notification command from the SES by updating, in a nondisruptive manner, structures of list notification vectors and summary indicators which reside in the HSA (Hardware System Area) in the CPC and which were defined for the lists which incurred the list-state transitions.

Programmed applications (or users) do not directly access the list-notification structures in the HSA. CPU instructions are provided, and they support the definition, the interrogation, and the change of information in the list-notification structures in the HSA.

BRIEF DESCRIPTION OF THE DRAWINGS

FIGS. 4A, 4B and 4C are block diagrams illustrating the structure and contents of a message related control blocks.

DESCRIPTION OF THE PREFERRED EMBODIMENT

Overview

Figure 1:
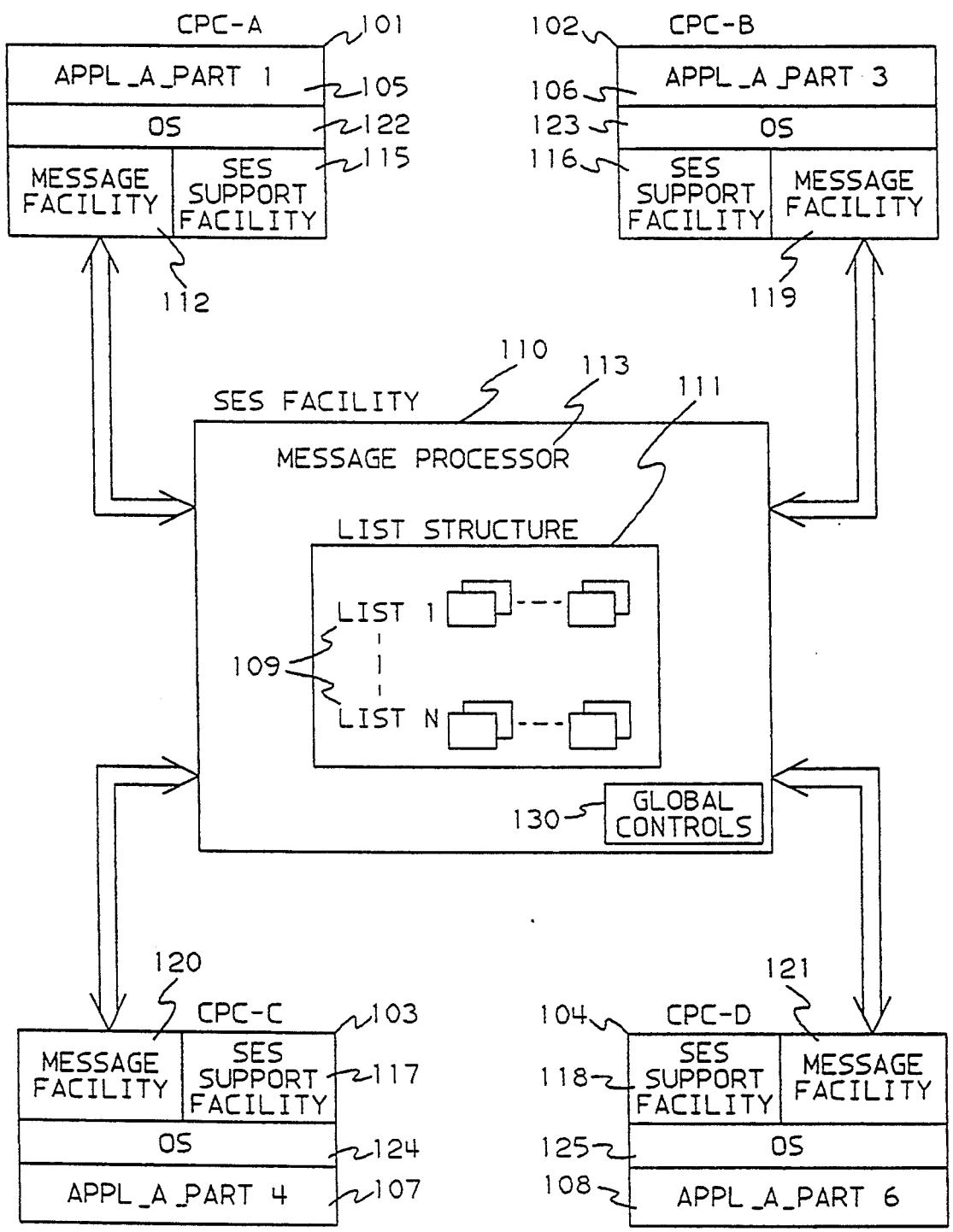
FIG. 1 is a block diagram illustrating the environment in which programmed-applications in different CPCs are sharing a List in the SES device.

In FIG. 1, a configuration is described which enables a complex of CPCs 101-104 to issue requests to, and receive responses from, a coupling facility. structured external storage (SES) facility 110. Programming can request operations to be performed by the SES which are designed to operate upon data resident in the SES and return status information. The SES-list structure 111 is supported within the SES by necessary operations to facilitate the queueing of shared data objects (e.g., messages) in such a multi-system configuration.

Clients and servers are exemplary applications 105-108 that execute on a CPC 101-104.

The actions of placing or removing messages on/from a list 109, cause the list at indeterminate times to change from the empty state (no messages on the list) to the not-empty state (one message on the list), or from the not-empty state to the empty state.

List-state transitions, therefore, occur;
 1. when a list changes from the empty state to not-empty state, and/or
 2. when a list changes from the not-empty state to empty state.

Objects, commands, and instructions are described whereby;

1. Application programs (users) register their interest in list-state transitions,
2. Management of list-state transitions is centralized within the SES Facility and the SES Support Facilities 115–118 within each CPC. The SES Support Facility (SSF) 115–118 is a processing facility attached to each CPC 101–104 in the SYSPLEX. Its function in list-state transition notification processing is to interface with the message facility 112, 119–121 to process list-notification commands from the SES. The commands instruct the SSF to update the list-notification objects (FIG. 10 at 1001) to reflect list-state transitions for the user and list specified in the operands on a list-notification command.
3. Notifications of list-state transitions from the SES to CPCs are unsolicited and do not interrupt the programs executing on the CPU.
4. Operating Systems within each CPC, under which the registered application programs operate, are provided with efficient system polling functions.

The program, APPL-A, in FIG. 1, is an example of a list user. It consists of different tasks which can be distributed across a number of CPCs where each task is sharing lists which reside in and are managed by the SES facility 110.

List structure 111 is created by the issuing of the Allocate-List-Structure (ALST) command to the SES Facility 110. (For example, this may be done by the operating system (controlling one of the programs in a CPC) issuing the command on behalf of the application. Further details on this and other List commands are contained in the section entitled "List Structure Commands", below.) A list structure 111 consists of many objects and is illustrated in detail in FIGS. 2 and 3. This discussion concentrates on the lists 109 (LIST-1, ..., LIST-n) which are created by the initial ALST command.

Figure 13:
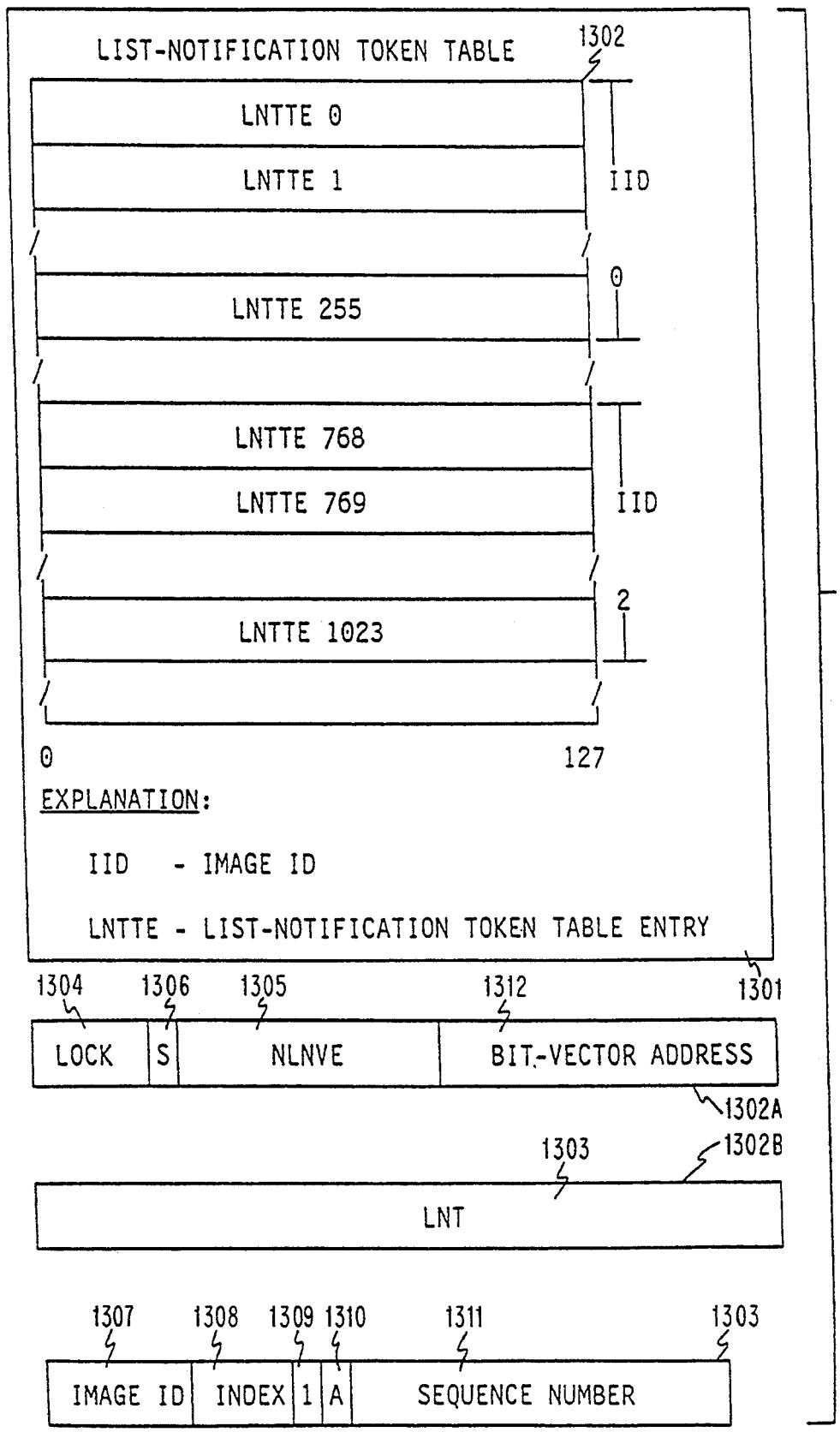
FIG. 13 is a block diagram illustrating the structure of the list-notification-token-table (LNTT) object.

Each list-user task (e.g., APPL-A-PART-3 106) assigns itself as a user of the list structure by issuing the Attach-List-Structure-User (ALSU) command to the SES Facility. The ALSU command provides a facility to associate a list notification vector (FIG. 10 at 1002 (identified by a List Notification Token (FIG. 13 at 1303)) and a particular path group to the SES from the CPC, with the user, initializes the user controls object 210 (by placing the LNT and path group identifier in it) and records the specified list user identifier 607. Software (programming application) assigns the list user identifier.

The list-user task has an interest in the state transitions of lists 109 in that the task which is serving specific lists would like to know when lists become not-empty, so that the list entries 302 can be dequeued and processed.

List-users register their interest in list-state transitions by issuing the Register-List-Monitor (RLM) command to the SES facility 110. User interest in the empty to not-empty and not-empty to empty state transitions of lists 109 is registered by providing as operands on the RLM command, the specification of the list-notification entry 442, a list number 423, and a user identifier 418. The RLM command updates the list-monitor-table 316 for the specified list 109. The list-state transitions are recorded in the List Notification Vector objects 1001 which are defined at the CPC 101–104.

List users use list entry commands to add, delete, or move list entries 302 to the lists 109 in the list structure 111. All SES list commands capable of adding, deleting, or moving a list entry execute the list-state transition notification process when the processing of the list entry results in the empty to not-empty or not-empty to empty state transition of a list.

List users respond to list-state transitions that occur when lists in which they are interested change from empty to not-empty state, and/or not-empty to empty state.

The server task in a program (e.g., APPL-A-PART-4 107) is an attached list user, and is also registered to monitor for list-state transitions on specific lists (109). The server is responsible for removing message(s) from the list 109, and servicing the request. Additionally, the server may send the response back to the client indicating the service has been completed. The response may be presented to the client by placing a response message on a list 109 processed by the client. The server may accept and process requests until all requests have been processed and the list 109 of service requests is exhausted (empty). Typically, when the list of requests is exhausted, the server enters a wait state or performs lower priority work until notification is received indicating additional requests have been placed on the list for service. The server is prepared to respond to list-state transition notifications that occur when the list 109 of work changes from the empty to not-empty state.

Servers also use the full range of SES list commands that can result in list-state transitions that are of interest to itself or other list users.

An application program can terminate its use of the list-structure(s) 111 in the SES by using SES list commands to release the acquired SES resources 1. It can terminate its interest as a list monitor through the Deregister List Monitor (DLM) command. A user's interest in the empty to not-empty and not-empty to empty state transitions of a list 109 is removed by providing the specification of the list-user identifier 418 and providing a list number 423. The DLM command updates the list-monitor-table 316, and insures that pending list notifications are processed before its completion.
2. It can terminate itself from being a user of a list-structure 111 by issuing the Detach-List-Structure-User command (DLSU). The DLSU command invalidates the specified list-user identifier 607, disassociates the list-notification-vector from the SES list structure 111, and frees the related list-user controls 210. The DLSU command also clears information for the user in all List Monitor Tables 316, and insures that pending list notifications are processed before its completion.
3. It can delete an entire list-structure 111 from the SES 110 by issuing the Deallocate-List-Structure command.

List-State Transition Registration, Detection

Figure 5:
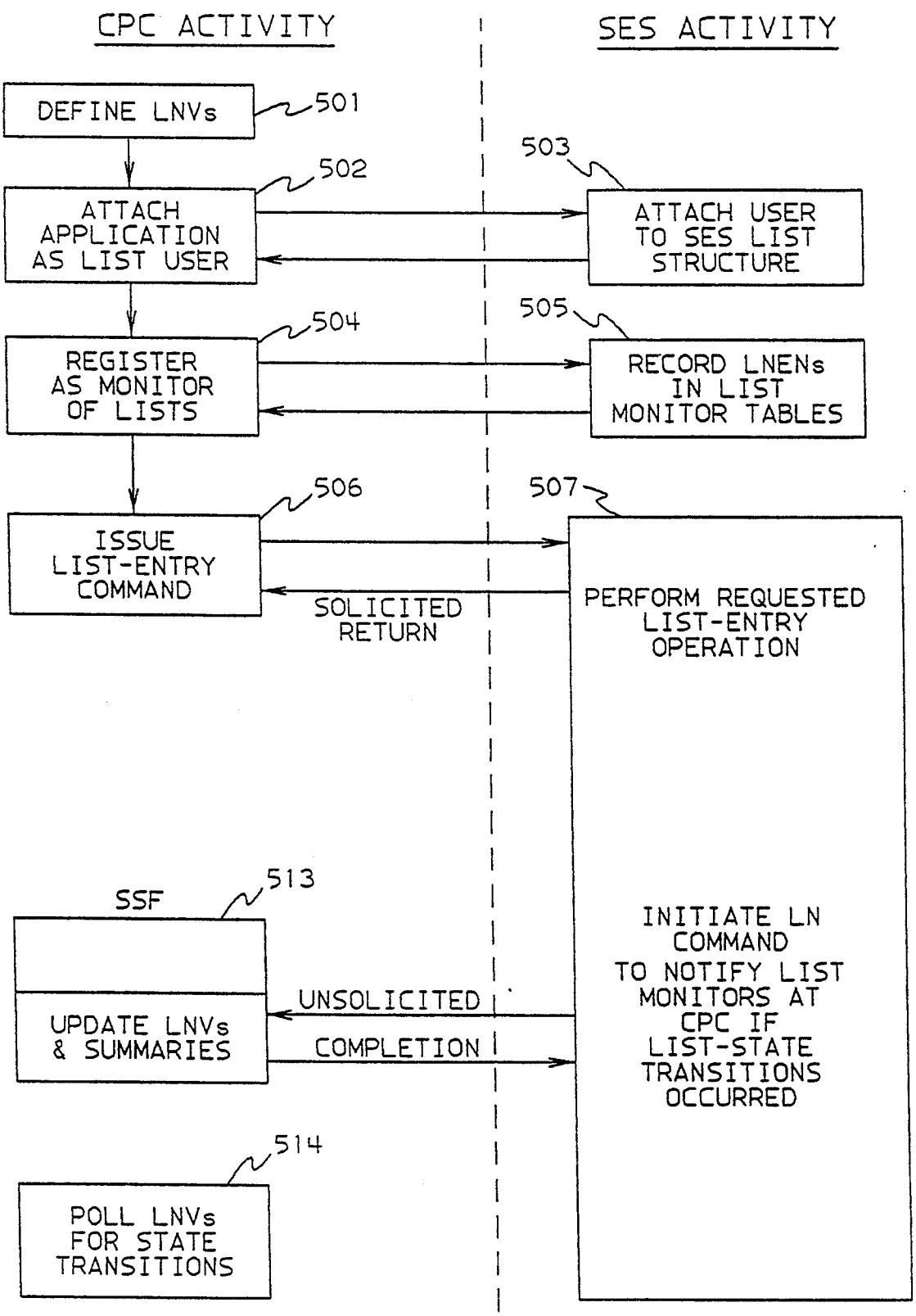
FIG. 5 is a flowchart illustrating steps in the process for a programmed-application to acquire, access, and monitor lists of data entries in the SES device.

FIG. 5 describes the interaction between a user (programmed application) 105–108 at the CPC 101–104 issuing commands to the SES Facility 110, and the management functions performed at the SES in response to the command requests to support the registration of the user for list-state transition notification, to detect list-state transitions, and to notify the user of list-state transitions.

The high performance list-state transition notification function provided through the use of a list-notification vector 1002 is achieved by means of the SES-list transition notification process (executed by the SSF in the CPC) and the appropriate manipulation of the list-notification vector by programming at the CPC before and after the execution of SES list commands.

A list-notification bit vector (LNV 1002) is optionally defined by a SES list user at the CPC. The list-notification vector is in a processor storage area created (FIG. 5 at block 501) by the Define Vector CPU instruction.

For each list notification vector 1002 created by the Define Vector Instruction on the CPC there exists a list-notification vector local summary indicator (LNVLS 1003). Through a program specified option (LNRT 445) on the Register List Monitor command, the list-notification vector local summary indicator is set when any list-notification command is processed against the associated list-notification vector 1002 indicating an empty to not-empty list-state transition. The list-notification vector local summary indicator is not updated as a result of a not-empty to empty list-state transition. The update of the list-notification summary indicator is specified under programming control through use of a Register-List-Monitor command option, the LNRT operand 445.

On a CPC there exists one list-notification vector global summary indicator 1004 per CPC image. The global list-notification vector summary indicator is set when any list-notification vector local summary indicator 1003 is set to indicate an empty to not-empty SES list-state transition. The global list-notification vector summary indicator is not updated as a result of a not-empty to empty list-state transition.

The LNV 1002 is attached to the SES list structure 111 through the use, (FIG. 5 at block 502) of the Attach-List-Structure-User (ALSU) command. The ALSU command is described below in the section entitled "Commands". Each entry 1005 in a list-notification vector 1002 may be associated with one or more lists 109 in the SES list structure.

The list-state transition notification process is both a SES list function and a SES Support Facility 115–118 function which is optionally requested by the SES list user through use of the attach-list-structure-user command (and Register List Monitor command, described later). When requested, additional controls in the user controls object 210 are initialized, the relationship between the SES list structure 111 and the list-notification vector 1002 on the CPC is established, and processes are enabled 503 which permit the operation of the list-state transition notification function.

Figure 6:
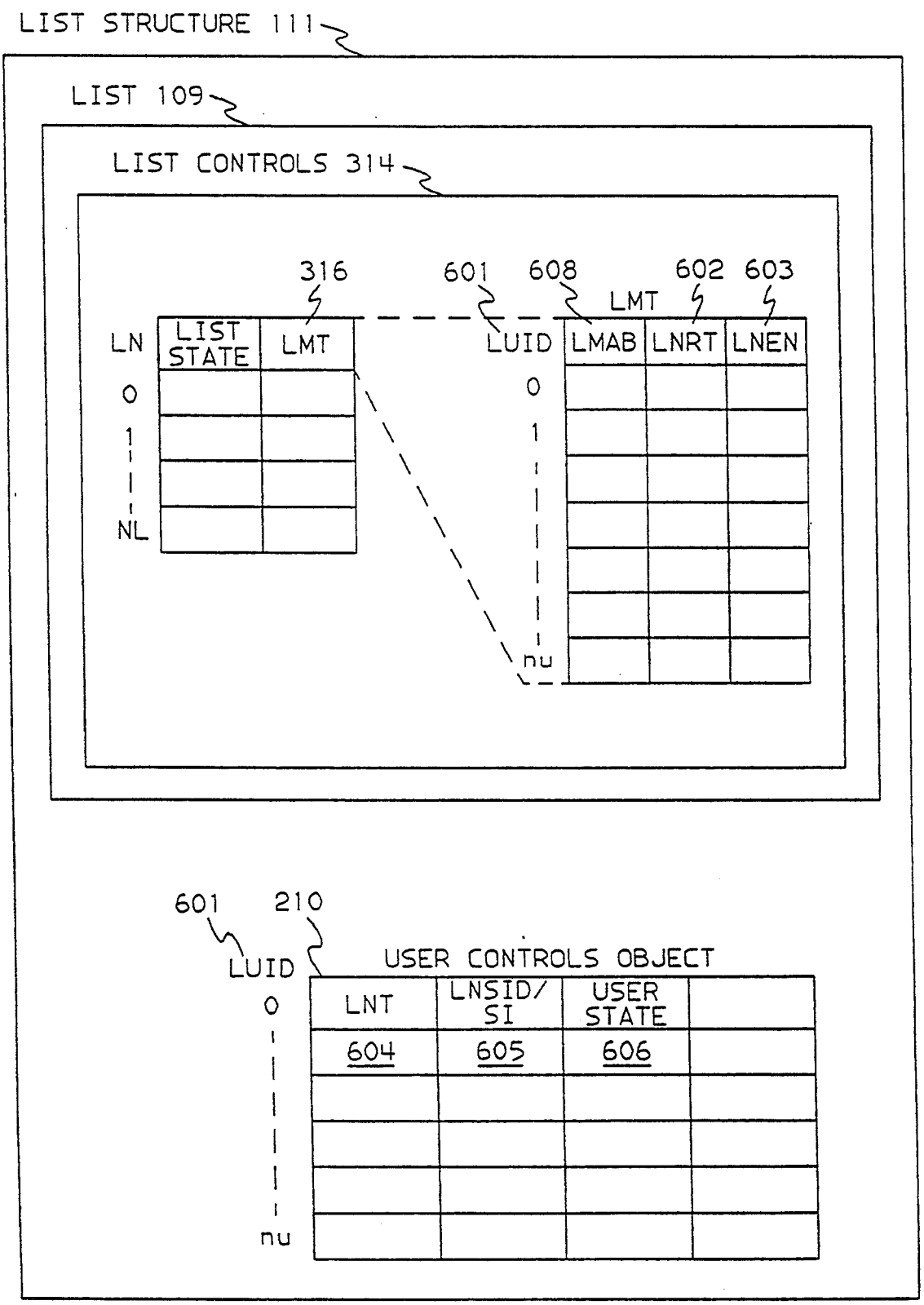
FIG. 6 is a block diagram illustrating the LMT and the user controls object.

FIG. 6 is a diagram of the List Monitor Table (LMT 316) and the User Control Objects 210. Both these data areas reside in the SES and are instrumental to list-state transition, detection and notification, process.

The list-monitor-table 316 is a list object containing the information used to record the list-notification vector entry 1005 number associated with users which have indicated interest in the empty to not-empty and not-empty to empty state transition of the list 109. There exists one list-monitor-table for each list 109 in the list set 202. FIG. 6 shows the format of the list-monitor-table. Each row in the table corresponds to a list-user (UID 418). Each row contains a list-notification-entry-number (LNEN) 603, a list-notification vector summary update request indication (LNRT) 602, and the LMAB 608 (a "valid" bit, set "on" at registration).

A row in the LMT is made valid, and a valid list-notification-entry-number 603 is registered on behalf of a specified list-user-identifier 601 in the list-monitor-table when the list transition registration process is executed in response to a register list monitor command for the specified list number 423. A row in the table is invalidated when a list-user is detached through use of DLSU command, or when the list transition deregistration process is executed on behalf of a specified list-user identifier (UID 418) for a specified list number 423.

Figure 10:
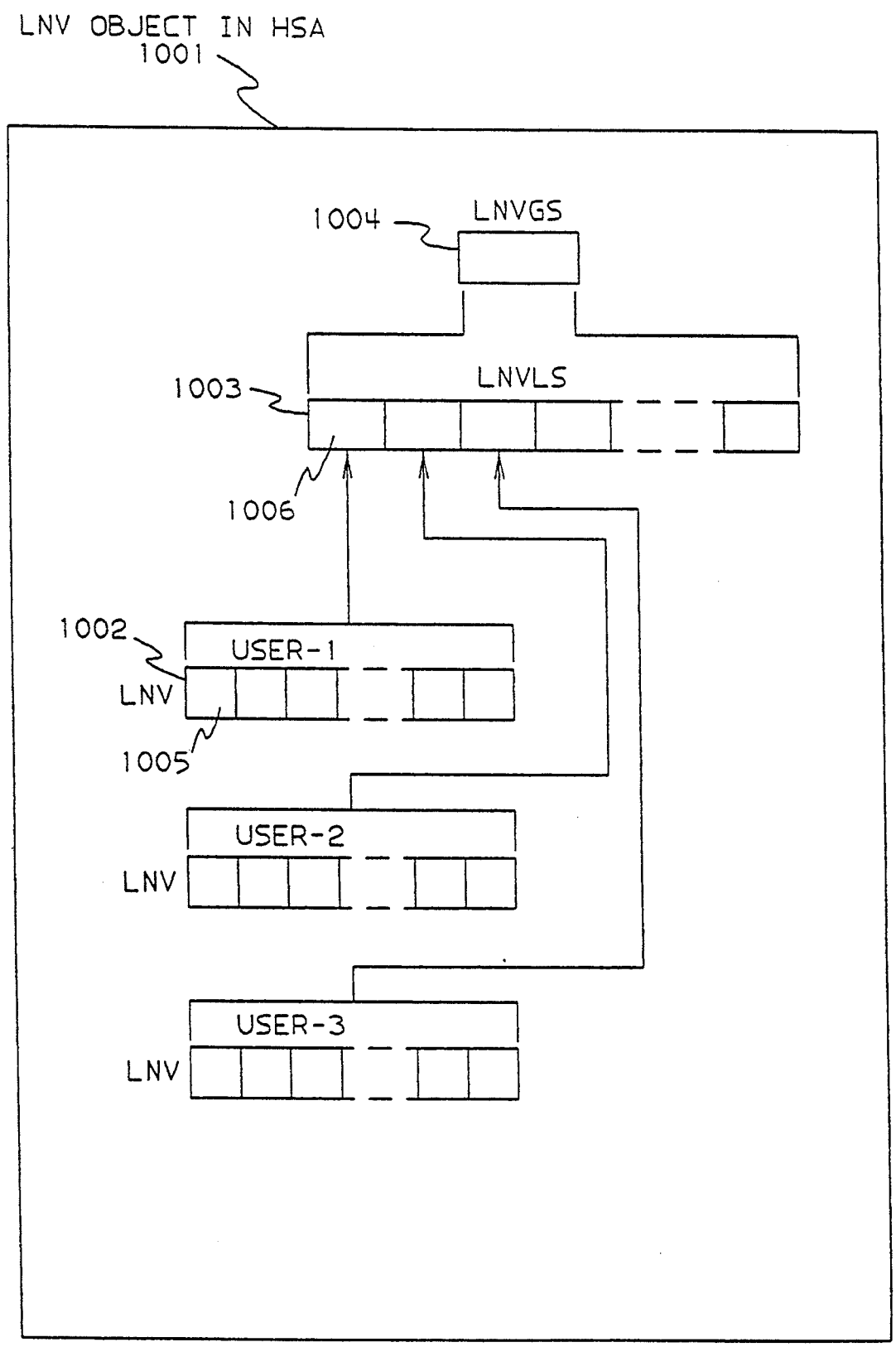
FIG. 10 is a block diagram illustrating the structure of the list-notification-vector objects on CPCs.

A list user is permitted to register interest, (FIG. 5 at block 504), in one or more lists 109 in a SES list structure 111 through use of the register-list-monitor command (RLM). This registration process also indicates (in the LNRT 445) whether list notification vector summary updates are required. (The RLM command is described below in the section entitled "List Structure Commands" below). Registration results in the association 505 of a specified list 423 within the SES list structure with a specified (LNEN 442) list-notification vector entry 1005 within the LNV at the CPC associated with the list user. After the registration process is complete for a specified list, the empty to not-empty or not-empty to empty state transition of the list at the SES results in the initiation of one or more list notification commands which result in notification of the list-state change at the CPC on which the registered list user(s) resides. The list-notification vector objects, local summary bits, and global summary bit are depicted by FIG. 10.

The program is responsible for indicating the initial empty or not-empty state of the list in the list-notification vector entry 1005 at the time list-notification registration is performed. The Set Vector Entry (SVE) CPU instruction is used for this purpose. To facilitate this, the register-list-monitor command provides (FIG. 5 at block 505) the list entry count 446 as an output parameter to allow the control program to set the initial state of the user's list-notification vector entry 1005. The Set Vector Entry (SVE) CPU instruction is used to set the list-notification vector entry to indicate an empty list-state before the execution of the register-list-monitor command is initiated. A nonzero list entry count 446 returned from the command causes the control program to reset the user's vector entry 1005 to the not-empty state and results in software forced initiation of list-state transition notification processes.

After the registration process is complete for a specified list 423, the empty to not-empty and not-empty to empty state transitions of the list 109 result in notification of the list-state change at the CPC on which the registered list user resides.

A set of commands that can cause list-state transitions to occur includes the set of single list-entry commands. This set of commands contain:
Write List Entry,
Move List Entry,
Delete List Entry,
Write and Move List Entry
Move and Read List Entry,
Read and Delete List Entry, and
Read List Entry (which does not cause list-state transitions).

When the SES processes (FIG. 5 at step 507) an individual list-entry command, there are many more steps than those depicted in FIG. 5 at step 507.

Figure 12:
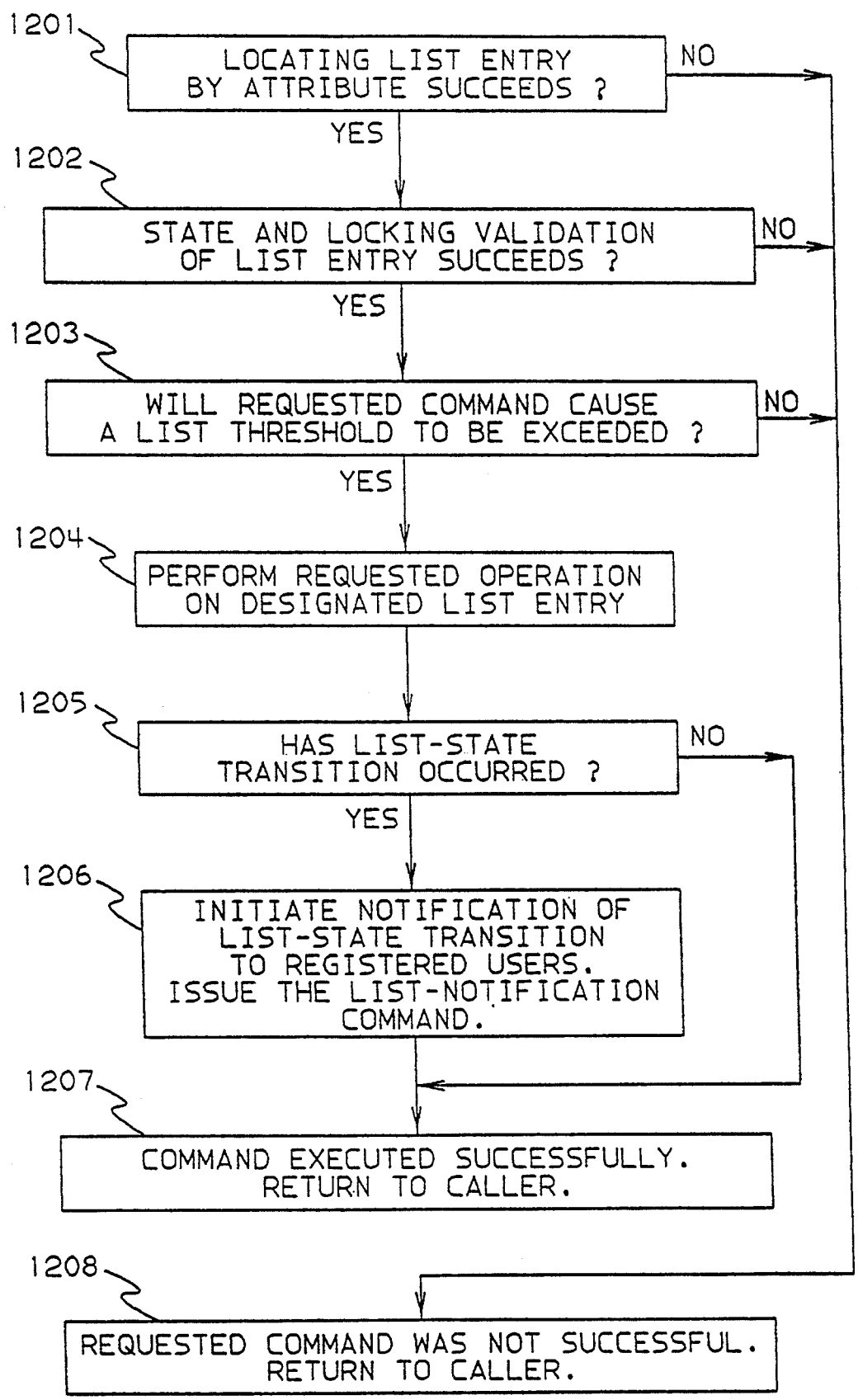
FIG. 12 is a flow chart illustrating for individual list-entry commands, the execution environment for the processes described in this invention along with those processes described in the other co-pending applications dealing with management of list structures in the SES Facility.

FIG. 12 illustrates more of the steps in the processing of an individual list-entry command. Steps 1204 through 1207 relate to this invention, and are described below. Steps 1201 through 1204 though not essential for understanding the present invention, are shown for completeness.

All SES list commands capable of creating, deleting, or moving (FIG. 5 at block 506) a list entry 302 execute the list-state transition notification process (FIG. 5 at 507 and 12 at step 1206) when processing of the list entry 302, results (FIGS. 5 at 507 and 12 at step 1205) in the empty to not-empty or not-empty to empty state transition of a list. The list-notification events are presented to the target CPC in the order in which the list-state transitions occur at the SES facility.

Figure 7:
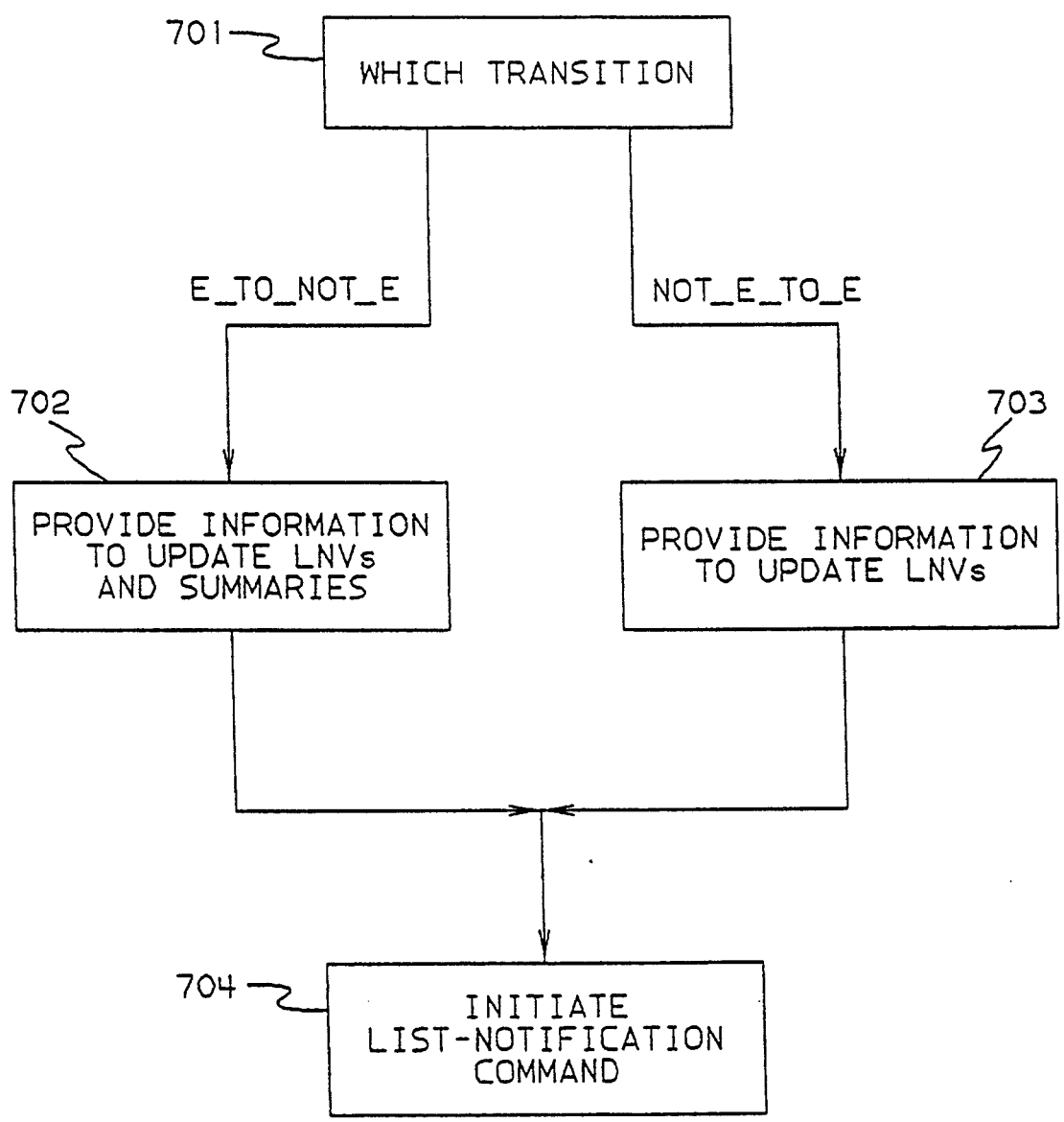
FIG. 7 is a flowchart illustrating the detail of the SES based support which detects a list-state transition and initiates list-notification commands to the interested CPCs.

For each list-state transition, a set of list-notification vector entries 603 are processed (FIG. 5 at 507 and 12 at step 1206). Each list-notification vector entry which is resident on a CPC 101–104 and is recorded in the LMT 316, is updated indicate the state transition of the associated list 109. This is accomplished by issuing a list-notification command to the target CPC. The detail of the list-notification processing at the SES is illustrated in FIG. 7 and described below in the section entitled "List Notification Process in the SES".

Referring again to FIG. 12, the delete, create or move operation is completed and the response operands for the operation is communicated (FIGS. 5 at 507 and 12 at step 1207) to the requestor. The list-notification command is initiated, but, its processing is asynchronous to that of the primary (direct) command (the delete, create, or move).

The response for the create/move/delete SES command request is processed (FIG. 5 at step 506) by list-user application at the CPC.

Figure 11A:
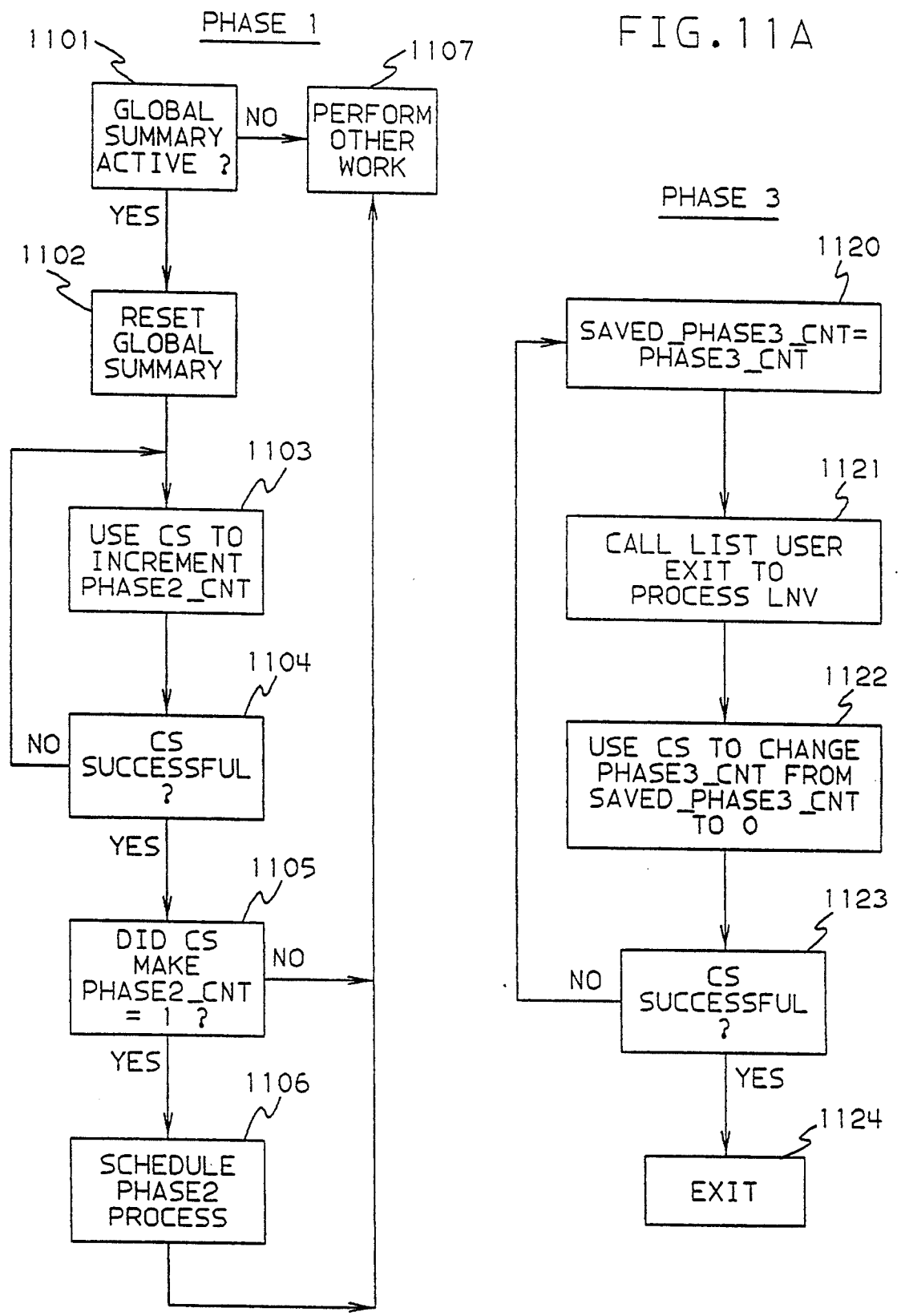
FIGS. 11A and lib are flowcharts illustrating how a CPC based program polls the list-notification vectors.

A list-state transition is detected at the CPC 101–104 in one of two ways: periodic polling of the appropriate entry 1005 in the list-notification vector 1002 at the CPC (FIG. 5 at 514); or event-driven processes triggered by the use of summary bits. The operating system control program uses the list-notification summary indicators 1004 and 1003 to provide an efficient system polling function on behalf of registered application programs. FIG. 11 illustrates this method of transition detection, which is further explained below under "Notification Through an Event-Driven Exit".

Figure 8:
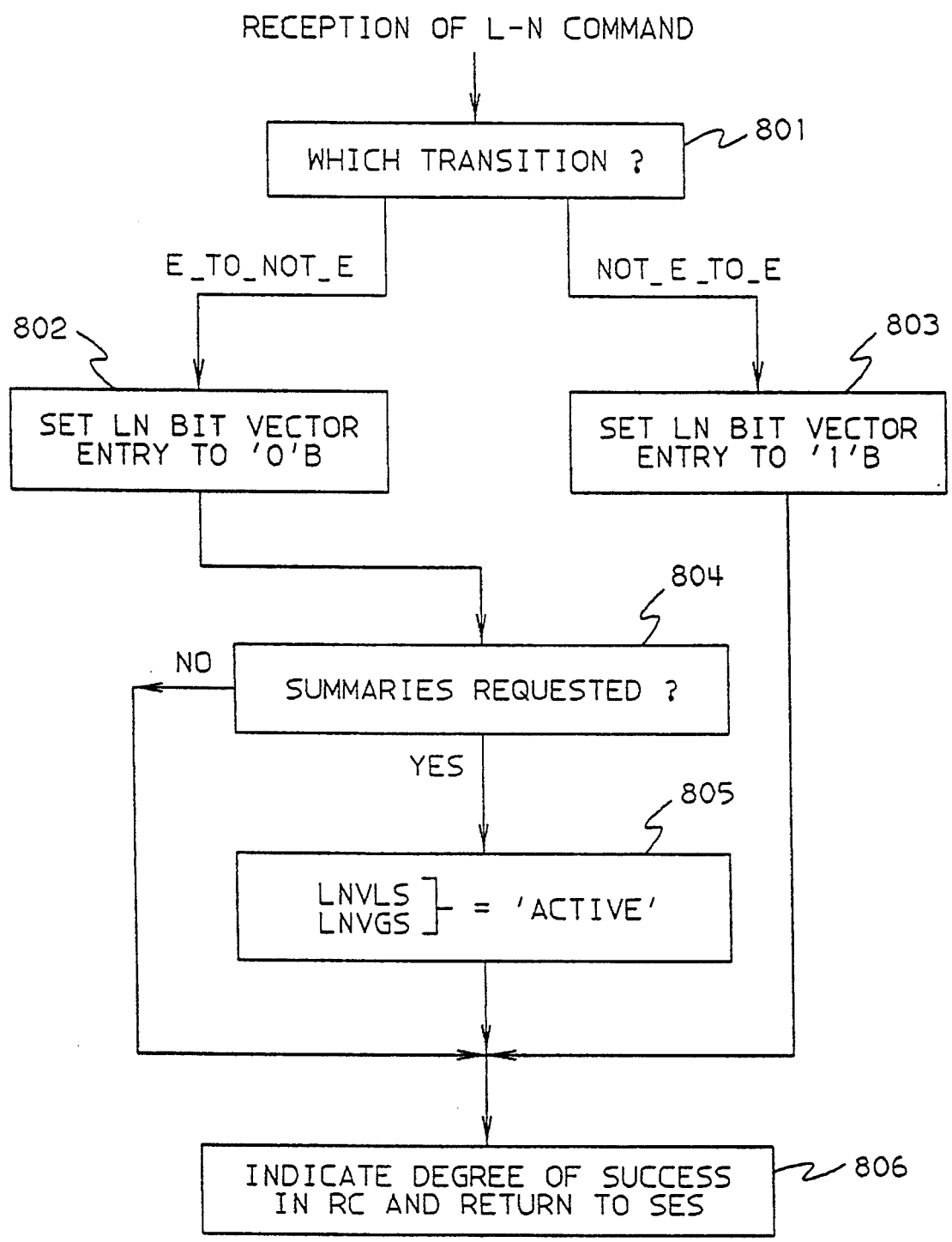
FIG. 8 is a flowchart illustrating the detailed process of the CPC based, SES Support Facility processing for list-notification operations.

The SES Support Facility 115–118 at the CPC processes (FIG. 5 at step 513) list-notification commands without incurring any interrupt or causing any other disruptive action to the work executing on the CPU. FIG. 8 illustrates this process which is described below in the section entitled, "List Notification Process at the CPC".

List Notification Process in the SES

FIG. 6 is a diagram of the List Monitor Table (LMT 316) and the User Control Objects 210. Both these data areas reside in the SES and are instrumental to the list-state transition (detection and) notification process.

FIG. 7 illustrates the process in the SES when a list-state transition has occurred and it is necessary to notify interested users of its occurrence.

The state-transition of a list is (FIG. 7 and step 701) either empty-to-not-empty or not-empty-to-empty depending on whether the list entry count 301 goes from zero to not-zero, or from not-zero to zero.

When a list-state transition occurs, one or more list-notification commands are initiated (FIG. 7 at step 704) to identified systems 605 on which a list user, having interest in the list, registered. All list-notification commands initiated as a result of a list-state transition are initiated before the command that caused the list-state transition is completed.

For the empty to not-empty transition, the LNT 604, LNEN 603, and the LNRT 602 become (FIG. 7 at step 702) operands (441, 442,445 respectively) on the list-notification command, along with the NESC 443 which is set to one.

For the not-empty to empty transition, the LNT 604 and the LNEN 603 become (FIG. 7 at step 703) operands (441, 442 respectively)on the list-notification command, along with the NESC 443 which is set to zero.

A list-notification command issued to a system to process an LNV as a result of a not-empty-to-empty state transition of a list must complete before a subsequent list-notification command that specifies the opposite state transition of the list may be issued 703 to process the same LNV on the same system.

The list-notification command provides the information necessary to update one list-notification entry 1005 and, when requested, the associated list-notification summaries 1003 and 1004, to reflect the new list-state.

Referring again to FIG. 7, the set of list-notification-vector entries 1005 which are associated with the affected list and user identifier(s) (FIG. 6 at 601), are processed 702 and 703. Each list-notification command is sent to a CPC over a message path link also used to initiate commands from the CPC to the SES facility. Each list-notification command is executed at a CPC by the SSF (SES Support Facility) without presenting an interrupt or causing any other disruptive action to the work executing on the CPU. When a list-notification command is completed, a response is sent by the intersystem channel from the CPC to the SES over the same intersystem link. When all the list-notification commands are completed the list notification process is completed.

List Notification Process at the CPC

The list-notification command provides the information necessary to update one list-notification entry 1005 and, when requested, the associated list-notification summaries 1003 and 1004, to reflect the new list-state.

A list-notification vector entry 1005 is set to 1 as a result of list transition to the empty state. A list-notification vector entry is set to 0 as a result of list transition to the not-empty state.

The reception of a list-notification command by the SES-support facility 115–118 results in a list-notification operation. The list-notification command operands include a list-notification token (LNT 441), a list-notification-entry number (LNEN 442), a not-empty state change indicator (NESC 443), and a bit indicating whether list-notification-vector summary updates are required LNRT 445). The list-notification operation includes updating the list-notification entry 1005 selected by the list-notification-entry number in the list-notification bit vector 1002 designated by the list-notification token by setting the selected list-notification bit vector entry 1005 to zero if an empty to not-empty list transition occurred or to one if a not-empty to empty list transition occurred and indicating by a response to the SES facility 110 that the list-notification operation occurred.

Updates to the list-notification vector object 1001 are performed in the following order: first the list-notification vector entry 1005 is set, followed by the list-notification local summary 1003 and then the list-notification global summary 1004.

FIG. 8 illustrates the process of the notification operation which occurs when the SES Support Facility 115–118 receives a list-notification command.

When the non-empty state change indicator (NESC 443) is on (FIG. 8 at step 801), the list-state transition to not-empty is indicated in the selected (LNEN 442) list-notification entry by setting the selected list-notification bit vector entry 1005 to zero unless the list-notification-entry number 442 is greater than or equal to the number of entries associated with this list-notification vector 1002 or unless the designated list-notification token 441 is invalid (as detected by the SSF). These conditions can occur if the size of the list-notification bit vector 1002 is modified or a list-notification token 441 is released while the controls 314 for the list 109 indicate interest by this user in the LMT 316. When they exist, these conditions cause immediate completion of the list-notification command and an indicative response code 407 is returned 806.

When NESC 443 is not on (FIG. 8 at step 801), the list-state transition to empty is indicated in the selected list-notification entry by setting (FIG. 8 at step 803) the selected list-notification bit vector entry 1005 to one unless the list-notification-entry number 442 is greater than or equal to the number of entries associated with this list-notification vector 1002 or unless the designated list-notification token 441 is not valid. These conditions can occur if the size of the list-notification bit vector 1002 is modified or a list-notification token 1303 is released while the controls 314 for the list 109 indicate interest by this user in the LMT 316. These conditions cause immediate completion of the list-notification command and an indicative response code 407 is returned.

When NESC 443 is not on (FIG. 8 at step 801), and the selected list-notification vector entry is updated (FIG. 8 at step 802), and the list-notification request type specifies to update the list-notification-vector summaries (LNRT 445) (FIG. 8 at step 804), the list-notification-vector local summary 1003 designated by the list-notification token and the list-notification-vector global summary 1004 are placed (FIG. 8 at step 805) into the active state.

When the list-notification command completes (FIG. 8 at step 806), the new state of the bit vector entry 1005 selected by the list-notification operation is visible to any CPU observing that bit vector entry by means of a TEST VECTOR ENTRY instruction. When the list-notification command completes, the new states of the list-notification-vector local summary 1003 and list-notification-vector global summary 1004 made active by the list-notification operation are visible to any CPU observing the list-notification-vector local summary or list-notification-vector global summary by means of a Test Vector Summary (TVS) CPU instruction.

Objects at the CPC
  List-Notification-Bit-Vector Space:
    HSA (Hardware System Area) storage is provided for each system image of a logically partitioned system (e.g., IBM's PR/SM).
  Locations of Assignment Structures:
    The addresses of the assignment structures are located in a portion of HSA referred to as the CPU common area. These addresses can be located at fixed offsets from the beginning of the CPU common area. The vectors that exist for each image are kept sequentially in image number order. Each CPU contains in its local-working storage the address of the CPU common area.
  List-Notification-Entry Number (LNEN) 603, 442.
    Specifies the number of a a list-notification bit vector entry 1005. The value of the list-notification-entry number must be within the range of the defined list-notification vector 1005.
  List Notification Request Type (LNRT) 602 445:
    A value that indicates whether list-notification vector summary indicators are to be processed on the CPC during the execution of a list-notification command. When the list-notification request type indicates that the list-notification vector summary indicators are to be processed, the empty to non-empty list state transition causes the list-notification vector local summary indicator 1003 designated by LNT 441 and the list-notification vector global summary indicator 1004 to be updated at the target CPC.
  List-Notification System ID (LNSID) 605:
    Used to identify the set of message paths connecting the SES 110 to the operating system at the CPC 101-104 containing the list-notification vector 1002 and associated entries. These message paths comprise a path group and are used to transmit list-notification commands to the CPC on which the list-notification vector resides 1002.
  List-Notification-Token (LNT) 604, 441, 1303:
    Used to identify the list-notification vector (bit vector) 1002 at the CPC.
    LNT is maintained in the list notification token table entry 1302 (comprising 1302A and 1302B; contents of 1302B are shown in 1303) and is assigned when a list-notification vector 1002 is defined. For execution of the SVE, TVS, SVS, or TVE instruction and the release, clear, or modify operations of the DV instruction, this field must match an operand of those instructions.
    A vector token is a value used to uniquely identify a particular list-notification vector 1002. A token is provided when a vector is defined and persists until the vector is released or a clear reset function is performed.
    The format of a list-notification token, as an operand of the DV, SVE, TVS, SVS, or TVE instruction or the list-notification command, is as follows:
    IMAGE ID 1307: For native execution, the image 10 is zero. For interpretive execution, the image ID is used to determine the image which assigned the bit vector identified by this LNT. This field only needs to reflect the number of images supporting the SES facility. In other words, the image ID field can range from zero to N where a value zero is provided for native execution and N indicates the number of images that support the SES facility. A unique Image ID number from 1 to N is assigned to each image supporting the SES facility. For native execution or when no images need attachment to a SES facility, both N and the active image number are zero.
    INDEX 1308: Identifies one of N list-notification bit vectors 1002 that could concurrently exist in the assigned state for this image.
    Assigned (A) 1310: Indicates that the list-notification token is assigned.
    Sequence Number 1311: A sequence number used to insure that list-notification tokens are never reassigned except following a clear reset operation.
    To facilitate the mapping of a LNT and LNEN 603 to a bit-vector entry, the following structures are provided:
      List-Notification Token Table
      List-Notification Bit Vector Space
    List-Notification Token Table (LNTT) 1301:

The list-notification token table contains N entries per image. Each entry corresponds to a list-notification vector 1002 that could be defined.

Each list-notification-token-table-entry (LNTTE 1302) is as follows:

Token Table Entry Lock 1304: Used to serialize the concurrent execution of a list-notification command and Define Vector (DV) CPU instruction. The Token Table Entry (TTE 1302) is locked during DV execution when the sequence number in the LNT 1303 or the number of bit vector entries (NLNVE 1305) is updated. The lock is also held during list-notification command execution.

List-Notification Token Summary 1306: Indicates a list-notification command was executed which updated an entry 1005 in the list-notification vector designated by the bit-vector address 1312 in the LNTTE 1302 to indicate a SES list transition to the non-empty state. It is set by the list-notification command and reset with the Set Vector Summary (SVS) CPU instruction.

Number of List-Notification Vector Entries (NLNVE) 1305: Contains a value which indicates the number of entries in the vector 1002. This value was contained in an operand of the DV instruction which defined, expanded, or contracted the list-notification vector.

Bit-Vector Address 1312: Contains the address of the first bit vector entry 1005 associated with this token.

List-Notification Vector Local Summary (LNVLS) 1003:

The list-notification vector local summary contains an entry for each list-notification vector 1002 created on the CPC. Each entry provides a summary indication of the execution of a list-notification command when a list-notification vector entry 1005 in the LNV 1002, indicates an empty to not-empty list transition. The LNVLS entry is set by the list-notification command and reset by the SVS instruction.

List-Notification Vector Global Summary (LNVGS) 1004:

The list-notification vector global summary contains an entry per CPC image. Each entry provides a summary indication of the execution of a list-notification command against any list-notification vector 1002 in the image, indicating an empty to not-empty list transition.

The LNVGS entry is set by the list-notification command and reset by the SVS instruction.

Example of Polling at the CPC

The high performance list-state transition notification function provided through the use of a list-notification vector 1002 is achieved by means of the SES-list transition notification process and the appropriate manipulation of the list-notification vector by programming before and after the execution of SES list commands.

A list-state transition is detected by periodically polling the list-notification vector global summary 1004 and the list-notification vector local summary 1003 and the appropriate entry 1005 in the list-notification vector 1002 at the CPU.

FIG. 11 illustrates a high level view of the process used by the MVS control program to detect changes in attached SES list user's list-notification bit vectors 1002. The figure depicts the use of each list-notification-vector summary 1003 and global summary 1004 to detect list-state changes from empty to not-empty and illustrates the dispatch (FIG. 11 at step 1115) of the attached user's program to process the state change.

Because the vector 1002 and summary 1003 and 1004 resides in storage local to the processor, examination of these objects is very efficient. Polling the vector can be performed as frequently as needed to achieve an appropriate responsiveness objective. In addition, the use of polling allows the event to be processed by the operating system when it is best able to do so and eliminates the undesirable effects on an interrupt such as cache disruption and premature preemption of higher priority work.

The operating system control program uses (FIG. 11 at step 1101) and (FIG. 11 at step 1103) the list-notification summary indicator 1004 to provide an efficient system polling function on behalf of registered application programs.

Notification by an Event-Driven Exit

FIG. 11 illustrates how a 3-phase process can be used by an operating system in a CPC to provide efficient state-transition notification to a list user, with appropriate and necessary serialization. Without some form of program provided serialization, it would be possible in an Operating System environment such as MVS/ESA to lose empty to non-empty state transitions. This adverse effect is caused by execution of concurrent polling processes at the CPC with list notification commands arriving at the SESF.

The TVS instruction is used to interrogate the state of the list notification global summary (at 1101). This test is placed in a frequently executed path of the dispatcher of an operating system such as IBM's MVS/ESA (Multiple Virtual Storage/ESA) to facilitate a high level of responsiveness. If the global summary is active, processing continues at step 1102. If the global summary is not active, processing unrelated to list notification is performed (1107).

After the active state of the global summary is detected, it must be reset to the inactive state by the program (1102). The SVS instruction is used for this purpose. The reset MUST be performed before steps 1103–1106 are performed to eliminate the possibility of resetting the summary and thereby losing a subsequent event that arrives at the CPC after the phase_2 process has run to completion.

Because multiple CPUs may be executing this process in parallel, a compare-and-swap instruction is used to provide an atomic increment of a count field used to govern phase_2 scheduling (1103). The "phase2_cnt" is incremented to indicate at least one list transition event (empty to not-empty) has been received on this system. The compare-and-swap sequence is repeated until it succeeds in incrementing the count field (1104).

If the update of the "phase_2_cnt" field caused the value to change from 0 to 1 (the "Y" path from 1105), (indicating the first detection of the active global summary), the phase_2 process is scheduled at 1106 to run asynchronously to perform the next phase of list notification event processing. If the value is not updated to 1, the asynchronous phase_2 process is not scheduled. Incrementing the count value to a number greater than 1 indicates asynchronous phase_2 processing had already been scheduled by another instance of the phase_1 process (which incremented the phase2_cnt from 0 to 1) and is now executing in parallel with this phase_1 process.

After the increment of the count field and conditional scheduling of the phase_2 process, the MVS dispatcher performs other work unrelated to list notification event processing (1107).

Phase 2

The phase_2 process is scheduled for asynchronous execution from the phase_1 process which increments the "phase2_cnt" field from 0 to 1 (1106). When entered for execution, the phase_2 process fetches and saves a copy of the "phase2_cnt" field (1108). This action is performed before any other phase_2 processing so that the fetched copy can be compared with the actual value of the "phase2_cnt" field after all local list notification local summaries have been tested.

An iterative process is then performed, where each iteration relates to a different list user (1109). The TVS instruction is used to test the local summary associated with the current list user (1110). If the state of the local summary is active, processing continues at step 1111. If the local summary is not active, processing continues at step 1116 where it determined whether additional list users exist.

After the active state of the local summary is detected (1110), it must be reset to the inactive state by the program (1111). The SVS instruction is used for this purpose. The reset MUST be performed before steps 1112-1115 are performed to eliminate the possibility resetting the summary and thereby losing a subsequent event that arrives at the CPC after the phase_3 process has run to completion.

Because multiple CPUs may be executing this process in parallel, a compare-and-swap instruction is used to provide an atomic increment of a count field used to govern phase_3 scheduling (1112). The "phase3_cnt" is incremented to indicate at least one list transition event (empty to not-empty) related to the current list user has been received on this system. The compare-and-swap sequence is repeated until it succeeds in incrementing the count field (1113).

If the update of the "phase_3 cnt" field causes the value to change from 0 to 1 (the "Y" path from 1114), (indicating the first detection of the active local summary), the phase_3 process is scheduled (at 1115) to run asynchronously to perform the next phase of list notification event processing for the current list user. If the value is not updated to 1, the asynchronous phase_3 process is not scheduled. Incrementing the count value to a number greater than 1 indicates asynchronous phase_3 processing had already been scheduled by another instance of the phase_2 process (which incremented the phase3_cnt from 0 to 1) and is now executing in parallel with this phase_2 process.

Processing continues at (1116) where it determined whether additional list users exist. When the local summaries of all list users have been examined (the "N" path from 1116), a compare-and-swap instruction is used to conditionally set the "phase2_cnt" to zero (1117) if the current value of the count field equals the copy of the count field value previously fetched at step 1108. If the CS instruction fails (the "N" path from 1118), then the count field must have been incremented by a phase_1 process (1103) execution concurrently with this phase_2 process. In this case, more list notification events (empty to not-empty) have arrived and the phase_2 process must be performed again (1108).

Note that the only way to exit the phase_2 process is to execute a successful compare-and-swap of the "phase2_cnt" field to zero at step 1117. This exit criterion is required because the phase_2 process will not be scheduled again until the count field is incremented from 0 to 1 (1105).

Phase 3

The phase_3 process is scheduled for asynchronous execution from the phase_2 process which increments the "phase3_cnt" field from 0 to 1 (1115). When entered for execution, the phase_3 process fetches and saves a copy of the "phase3_cnt" field (1120). This action is performed before any other phase_3 processing so that the fetched copy can be compared with the actual value of the "phase3_cnt" field after the list user list notification exit has been called (at 1121) to process individual list notification vector entries.

A compare-and-swap instruction is used to conditionally set the "phase3_cnt" to zero (1122) if the current value of the count field equals the copy of the count field value previously fetched at step 1120. If the CS instruction fails (the "N" path from 1123), then the count field must have been incremented by a phase_2 process (1112) execution concurrently with this phase_3 process. In this case, more list notification events (empty to not-empty) have arrived for this list user and the phase_3 process must be performed again (1120).

Note that the only way to exit the phase_3 process is to execute a successful compare-and-swap of the "phase3_cnt" field to zero at step 1122. This exit criterion is required because the phase_3 process will not be scheduled again until the count field is incremented from 0 to 1 (1114).

The Test Vector Entry (TVE) CPU instruction, when executed against a list-notification vector entry 1005, indicates the last known state of the list provided list-state-transition-notification for the list has been enabled by means of the attach-list-structure-user and register-list-monitor commands.

The TVE instruction is used to determine the empty or not-empty state of a selected list 109 after the Test Vector Summary (TVS) CPU instruction has indicated (FIG. 11 at steps 1110 and 1101) one or more list-notification events have been received and processed by the SES-support facility 115-118. The list-notification-vector local summary 1003 and list-notification-vector global summary 1004 are updated as a result of at least one list 109 mapped in the list-notification vector 1002 entering the not-empty state.

Because a list-notification-vector local summary is not updated, as a list-notification vector entry is, when a list becomes empty, it must be explicitly reset 1111 by the operating system through use of the Set Vector Summary (SVS) CPU instruction. Note that a list-notification-vector local summary observed on a first system 101-104 may indicate a list transition to the not-empty state and persist even though another system had observed the state change and subsequently removed all entries 302 from the list 109. Use of the TVE instruction in the user program driven within the first system prior to, and in close proximity of, SES command initiation may detect the now empty state and so eliminate unproductive accesses to an empty list.

When using the TVE and SVE CPU instructions, two operands are required to identify a list-notification vector 1002 and select its corresponding bit-vector entry 1005. One operand is a list-notification token, required to select the correct bit vector 1002. The other operand is the list-notification-entry number, required to select the correct entry 1005 within the bit vector 1002. (For TVS or SVS, a method for indicating access to the global summary or a valid list notification token (indicating access to the local summary of the identified vector) are provided.)

The TVE, SVE, TVS, SVS AND DV CPU instructions are described in more detail in the section below which is entitled, "CPU Instructions".

Commands

1. Attach List Structure User Command (ALSU)

The ALSU command identifies a list notification vector 1002 to an existing SES List structure 111, initializes the list-user controls 210 and assigns the specified list-user identifier 601.

2. Detach List Structure User Command (DLSU)

The DLSU command invalidates the specified list-user identifier 601, disassociates the list-notification-vector 1002 from the SES list structure, and frees the related list-user controls 210. Before the DLSU command completes, it ensures that all previously initiated list notification commands are allowed to complete.

3. Register List Monitor Command (RLM)

The register-list-monitor command provides programming the ability to register interest in a specified list so that transitions in the list from the empty to the non-empty and non-empty to empty states result in notification at the CPC on which the program is executing. List-transition registration is required to enable the list-state-transition notification process. List-transition registration is performed at the SES facility and consists of recording the list-notification entry number in the List Monitor Table (316). The program is responsible for indicating the initial empty or non-empty state of the list in the list-notification vector at the time list-notification registration is performed. The SVE instruction is used for this purpose.

A user's interest in the empty to not-empty and not-empty to empty state transitions of a list 109 is registered by providing the specification of the list-notification entry, a list number 423, and a list notification request type (LNRT) 445. A list-notification entry is specified by a list-notification-entry number 442. The RLM command updates the list-monitor-table 316 for the specified list 109.

Figure 9:
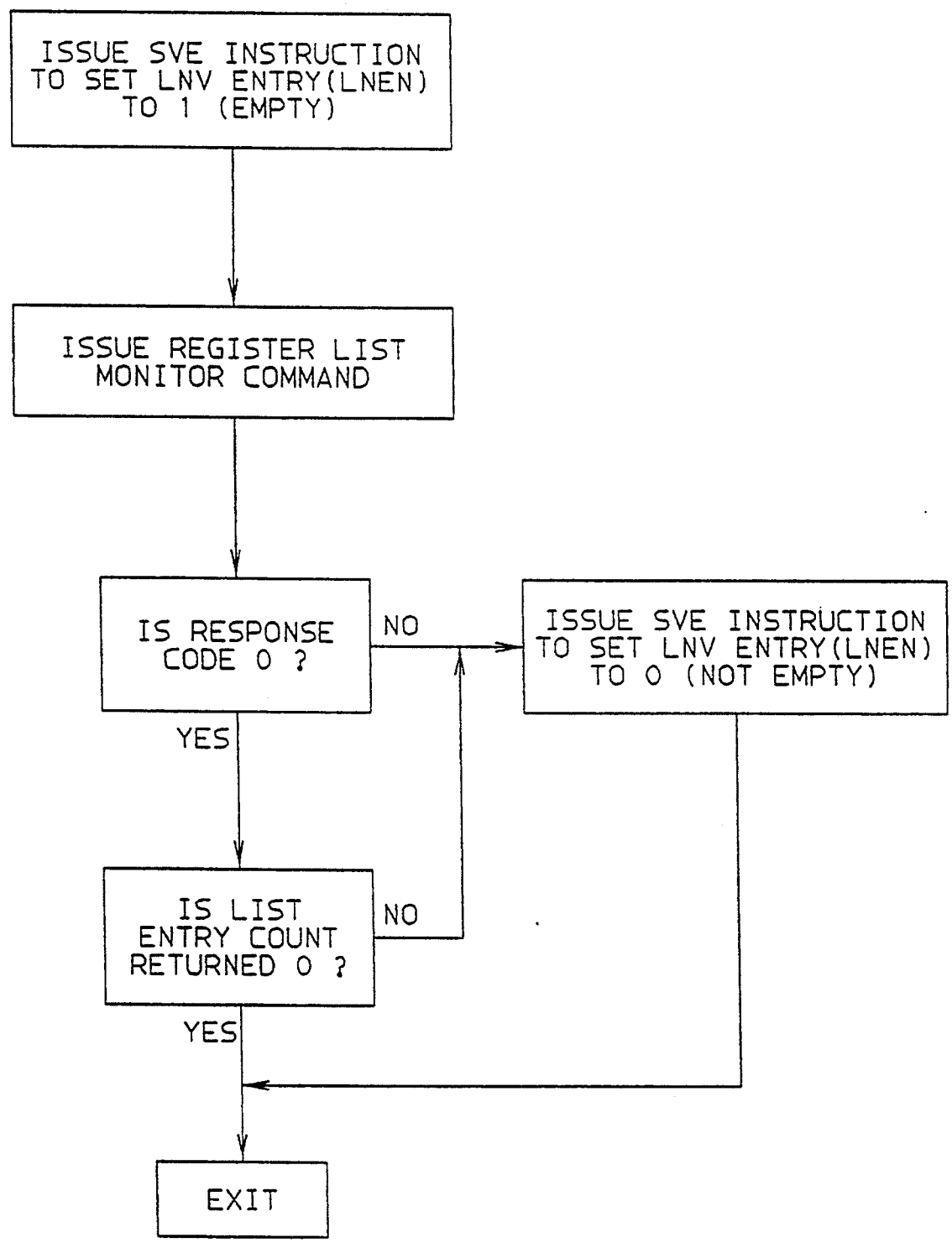
FIG. 9 is a flowchart illustrating the Register List Monitor Service.

When a user registers interest in a list with a RLM command, it is necessary to initialize the associated LNEN in the vector to record the current state of the list. The SVE instruction is used to set the list-notification vector entry before initiation of register-list-monitor command which designates the entry for purposes of list-transition registration. If the command response indicates the list is non-empty, or command failure is either indicated or presumed, the SVE instruction is used to reset the list-notification vector entry. This process is depicted in FIG. 9. Occasional over-indication of a non-empty list is allowed; falsely indicating the empty state of a list is not. Because it is possible for a SES-support facility to receive and execute a list-notification command against a designated list-notification vector entry after interest in the list has been registered at the SES but before the response to the register-list-monitor command is received, the update of the list notification vector entry by the program indicating the initial empty or non-empty state of the designated list in the list-notification vector by the program must be serialized with execution of the register-list-monitor command.

The program must not set the list notification vector entry after it is reset by an intervening list-notification command. Otherwise, notification of a list transition to the non-empty state may cause the program to enter a permanent wait state.

4. Deregister List Monitor Command

The DLM command updates the list-monitor-table 316. A user's interest in the state transition of a list 109 is removed by providing the specification of an assigned list-user identifier 418 and providing a list number 423. The list-notification-entry number 603 is removed from the list-monitor-table 316 for the specified list by setting the row in the list-monitor-table associated with the list-user identifier to the invalid state (as indicated by 608).

Before the DLM command completes, it ensures that all previously initiated LN commands for this user and this list, are allowed to complete.

5. List Notification Command

The reception of a list-notification command by the SES-support facility 115–118 at the CPC results in a list-notification operation. The list-notification command contains a list-notification token (LNT 441), a list-notification-entry number (LNEN 442), a not-empty state change indicator (NESC 443), and a field indicating whether list-notification-vector-summary updates are required (LNRT 445).

The list-notification operation includes updating the list-notification entry 1005 selected by the list-notification-entry number 442 in the list-notification vector 1002 designated by the list-notification token 441 by setting the selected list-notification bit vector entry 1005 to zero if an empty to not-empty list transition occurred or to one if a not-empty to empty list transition occurred and indicating by a response 407 to the SES facility 110 that the list-notification operation occurred.

CPU Instructions

DEFINE VECTOR

A bit vector of specified size (N) consisting of entries 0 through N−1 is established on the CPC, released, cleared to zeroes, expanded, or contracted and the result is indicated in the condition code.

A general register contains a value which indicates how the operation of Define Vector proceeds and how the contents of the general registers are interpreted. The designated general registers may contain one or more of the following:

1. A list-notification token (LNT) currently assigned due to the execution of a preceding Define Vector instruction.

2. A value indicating the number of bit vector entries (NBVE).

Operations performed by Define Vector depend on the contents of the general register.

The contents specify to define the list-notification vector, release the vector, clear the vector, or modify vector size.

List-notification tokens are uniquely assigned between clear reset operations. Once a token has been first assigned and then released, that token may not be re-used until a clear reset occurs. In interpretive execution mode, list-notification tokens are uniquely assigned for the image issuing the DEFINE VECTOR instruction.

A serialization function is performed before the operation begins and again after the operation is completed. As is the case for all serialization, this serialization applies only to this CPU; other CPUs are not necessarily serialized.

The execution of DV which results in making one or more bit vector entries 1005 available for reuse is not completed until all other CPUs and message paths in the configuration have completed any accesses to the vector entries being released.

DEFINE LIST-NOTIFICATION VECTOR: If the value in the general register specifies to define the list-notification vector, then another register contains the number of list-notification bit vector entries to be defined.

A list-notification token 1303 is assigned to identify the list-notification bit vector 1002 being defined to the CPC 101-104. The LNT replaces the contents of the register pair designated by the register field. The list-notification token provided may not be reassigned until after a clear reset function is performed.

A bit vector 1002 is established which consists of one bit for each list-notification bit vector entry requested. When a bit vector is established, all list-notification bit vector entries 1005 are reset.

A list-notification-vector local summary 1003 is established and initialized. The relationship of the list-notification-vector 1002 to the list-notification-vector local summary 1003 and to the list-notification-vector global summary 1004 is established. The LNT 1303 identifies the list-notification bit vector 1002 and the associated list-notification-vector local summary 1003.

VECTOR: If the value in the general register specifies to release the vector, then other registers contains a LNT to be released.

The list-notification token 1303 is released and the bits of the bit vector 1002 existing for that token are made available for reuse. The bit vector is said to no longer exist, and becomes undefined to the CPC 101-104. The bit-vector bits 1005 are not assigned for reuse until every bit has been cleared.

CLEAR VECTOR: If the value in the general register specifies to clear the vector, then other registers contain a LNT which designates a bit vector 1002 to be cleared.

All entries in the designated bit vector 1002 are cleared. Only the bit vector entries 1005 are cleared. The associated list-notification-vector local summary 1003 remains unchanged.

MODIFY VECTOR SIZE: If the value in the general register specifies to modify the vector size, then other registers contain a LNT which designates a bit vector 1002 to be modified.

Another register contains a value indicating the number of bit vector entries (NBVE).

A new number of bit vector entries 1005 is established for the bit vector 1002 identified by the LNT. The bit vector is redefined to the CPC 101-104. The LNT token remains the same. The bit vector, established by the preceding DEFINE VECTOR instruction which assigned the LNT, is expanded or contracted to reflect the new number of bit vector entries.

If the bit vector 1002 is expanded, then the state of the bit vector entries 1005 reflected in the portion of the bit vector that existed prior to expansion remains unchanged, and the the bit vector entries reflected in the newly established portion of the bit vector are reset.

If the bit vector 1002 is contracted, then the state of the bit vector entries 1005 reflected by the remaining portion of the bit vector is unchanged, and the portion of the bit vector no longer needed may be reused after each bit is cleared.

Tokens 1303 and space for bit vector entries 1005 are independently assigned and managed on a per-image basis. These resources are not shared across multiple images.

SET VECTOR ENTRY

The value of the selected bit vector entry 1005 is set or reset and the result is indicated in the condition code. No list-notification-vector local summary 1003 or list-notification-vector global summary 1004 is updated.

A general register contains a value which indicates how the operation of Set Vector Entry proceeds. One of two operations is performed by SVE depending on the contents of the general register.

The contents specify to set or reset the vector entry.

The other registers contain a list-notification token (LNT) currently assigned due to the execution of a preceding Define Vector instruction. The LNT identifies a list-notification bit vector 1002.

Another general register contains a field called the list-notification-entry number (LNEN) for list-notification bit vectors 1002, which selects an entry in the bit vector. The number of entries for this bit vector 1002 was established by a preceding DEFINE VECTOR instruction.

A condition code is set and the bit vector entry 1005 selected by the LNEN is set or reset in the bit vector identified by the LNT.

SET VECTOR SUMMARY

The value of the selected list-notification-vector local summary 1003 or list-notification-vector global summary 1004 is set or reset and the result is indicated in the condition code. Setting or resetting the list-notification-vector local summary has no effect on the list-notification-vector global summary.

A pair of general registers contains a list-notification token (LNT) currently assigned due to the execution of a preceding Define Vector instruction. The LNT identifies the selected list-notification-vector local summary 1003.

A general register contains a value which indicates how the operation of the Set Vector Summary instruction proceeds. One of two operations is performed by SVS; either the vector summary is set or reset.

A field contains a value which indicates whether the list-notification-vector global summary 1004 is placed into the set or reset state or the list-notification-vector local summary 1003 designated by the LNT is placed into the set or reset state.

A serialization function is performed before the operation begins and again after the operation is completed. As is the case for all serialization, this serialization applies only to this CPU; other CPUs are not necessarily serialized.

For each list-notification vector 1002 created on the CPC there exists a list-notification-vector local summary 1003. As a program specified option of the register-list-monitor command, the list-notification-vector local summary is set when any list-notification command is processed against the associated list-notification vector to reflect an empty to not-empty list transition. The list-notification-vector local summary is NOT updated as a result of a not-empty to empty list-state transition. The list-notification-vector local summary is tested by the Test Vector Summary (TVS) instruction and set or reset by the Set Vector Summary (SVS) instruction.

On a CPC there exists one list-notification-vector global summary 1004 per CPC image. The list-notification-vector global summary 1004 is set when any list-notification-vector local summary 1003 associated with the CPC image is set to reflect an empty to not-empty SES list-state transition. The list-notification-vector global summary is NOT updated as a result of a not-empty to empty list-state transition. The list-notification-vector global summary is tested by the TVS instruction and set or reset by the SVS instruction.

TEST VECTOR ENTRY

The state of the selected bit vector entry 1005 is tested, and the result is indicated in the condition code.

A pair of general registers contains a list-notification token (LNT) currently assigned due to the execution of a preceding Define Vector instruction. The LNT identifies a list-notification bit vector 1002.

Another general register contains a value called the list-notification-entry number (LNEN) for list-notification bit vectors 1002, which selects an entry in the bit vector. The number of entries for this bit vector was established by a preceding DEFINE VECTOR instruction.

A condition code is set if the bit vector entry 1005 selected by the LNEN is one in the bit vector identified by the LNT.

TEST VECTOR SUMMARY

The current state of the selected list-notification-vector global summary 1004 or list-notification-vector local summary 1003 is indicated in the condition code.

A pair of general registers contain a list-notification token (LNT) currently assigned due to the execution of a preceding Define Vector instruction. The LNT identifies the selected list-notification-vector local summary 1003.

A field contains a value which indicates that the list-notification-vector global summary is selected.

A condition code is set when the selected list-notification-vector global summary 1004 or list-notification-vector local summary 1003 is in the reset state.

For each list-notification vector 1002 created on the CPC there exists a list-notification-vector local summary 1003. As a program specified option of the register-list-monitor command, the list-notification-vector local summary is set when any list-notification command is processed against the associated list-notification vector indicating an empty to not-empty list transition. The list-notification-vector local summary is NOT updated as a result of a not-empty to empty list-state transition. The list-notification-vector local summary is tested by the TVS instruction and reset by the SVS instruction.

On a CPC there exists one list-notification-vector global summary 1004 per CPC image. The list-notification-vector global summary is set when any list-notification-vector local summary associated with the CPC image is set to indicate an empty to not-empty SES list-state transition. The list-notification-vector global summary is NOT updated as a result of a not-empty to empty list-state transition. The list-notification-vector global summary is tested by the TVS instruction and reset by the SVS instruction.

Global Objects

The global objects identify the SES facility, describe its state, define its model-dependent limitations and summarize the status of its resources.

The fixed global controls are set at SES power-on reset and are not modified by any SES command.

The program-modifiable global controls are initialized at SES power-on reset and may be modified by subsequent SES commands.

The fixed global controls are summarized in the following table.

| Fixed Global Controls | Acronym |
|---|---|
| SID limit | SL |
| Total control space | TCS |

The program-modifiable global controls are summarized in the following table.

| Program-Modifiable Global Controls | Acronym |
|---|---|
| Free control space | FCS |
| Free space | FS |
| SID vector | SV |
| Total space | TS |

Free Control Space (FCS):
  An object or field that specifies the amount of control storage which has not yet been assigned and is available for assignment to a structure.
  The free-control-space value is initialized to the same value as the total-control-space value.

Free Space (FS):
  An object or field that specifies the amount of storage which has not yet been assigned and is available for assignment to a structure. The free-space value is initialized to the same value as the total-space value and represents the largest structure size that may be allocated in the SES facility.

SID Limit (SL):
  An object or field that specifies the maximum supported SID value.

SID Vector (SV):
  An object or field that specifies the assigned SIDs.

Total Control Space (TCS):
  An object or field that specifies the amount of storage defined in the SES control storage and available for the allocation of control objects for a structure.

Total Space (TS):
  An object or field that specifies the amount of storage defined in the SES storage and available for the allocation of structures.

| List Limits | Acronym |
|---|---|
| List-number limit | LNL |
| Lock-table-entry-characteristic limit | LTEXL |
| User-identifier limit | UIDL |

List-Number Limit (LNL):
  An object or field that specifies the maximum list number.

Lock-Table-Entry-Characteristic Limit (LTEXL):
  An object or field that specifies the maximum size of a lock-table entry.

User-Identifier Limit (UIDL):
  An object or field that specifies the maximum user identifier. The maximum-user-identifier value is the maximum number of list-structure users and list-notification vectors that can be attached to each list structure.

SES List Structure

A list structure consists of list-structure controls, user controls, and either a lock table, or a list set with list controls and list-entry controls, or both.

Each lock table consists of a sequence of one or more entries, which are numbered consecutively starting at zero. The list-structure type and lock-table-entry characteristic determines whether all the lock-table entries have a global-lock-manager object, a local-lock-managers object, or both.

The list-structure controls are initialized when the list structure is created. The list-structure controls contain the structure size, list-structure type, lock-table-entry count, nonzero-lock-table-entry count, lock-table-entry size, list count, list-element size, maximum data-list-entry size, maximum list-set-entry count, list-set-entry count, maximum list-set-element count, list-set-element count, user-identifier vector and user-structure controls.

The user controls are created and initialized when a list-structure user is attached. The user controls contain a list-notification token, system identifier, and user-attachment control.

Each list set consists of one or more lists, which are numbered consecutively starting at zero.

There are list controls associated with each list. The list controls contain a list-entry count or list-element count, a list-entry-count limit or list-element-count limit, a list-monitor table, a list-state-transition count, and a user list control.

Each list consists of a sequence of zero or more entries. The list-structure type determines whether all the list entries in the list set have a data list entry, an adjunct list entry, or both.

There are list-entry controls associated with each list entry. The controls contain list-entry-location information, a data-list-entry size, and a version number.

LIST STRUCTURE OBJECTS

List Structure (111)

The possible list-structure objects consist of: (Reference numbers are to FIG. 2.)
List-structure controls 201
User controls 210
List controls 314
List-entry controls 315
Lock table 205
List set 202

List-Structure Controls

The fixed list-structure controls are initialized when the list structure is created and remain unchanged until it is deallocated.

The program-modifiable list-structure controls are initialized when the list structure is created. The program-modifiable control values may be changed by SES commands.

Figure 2:
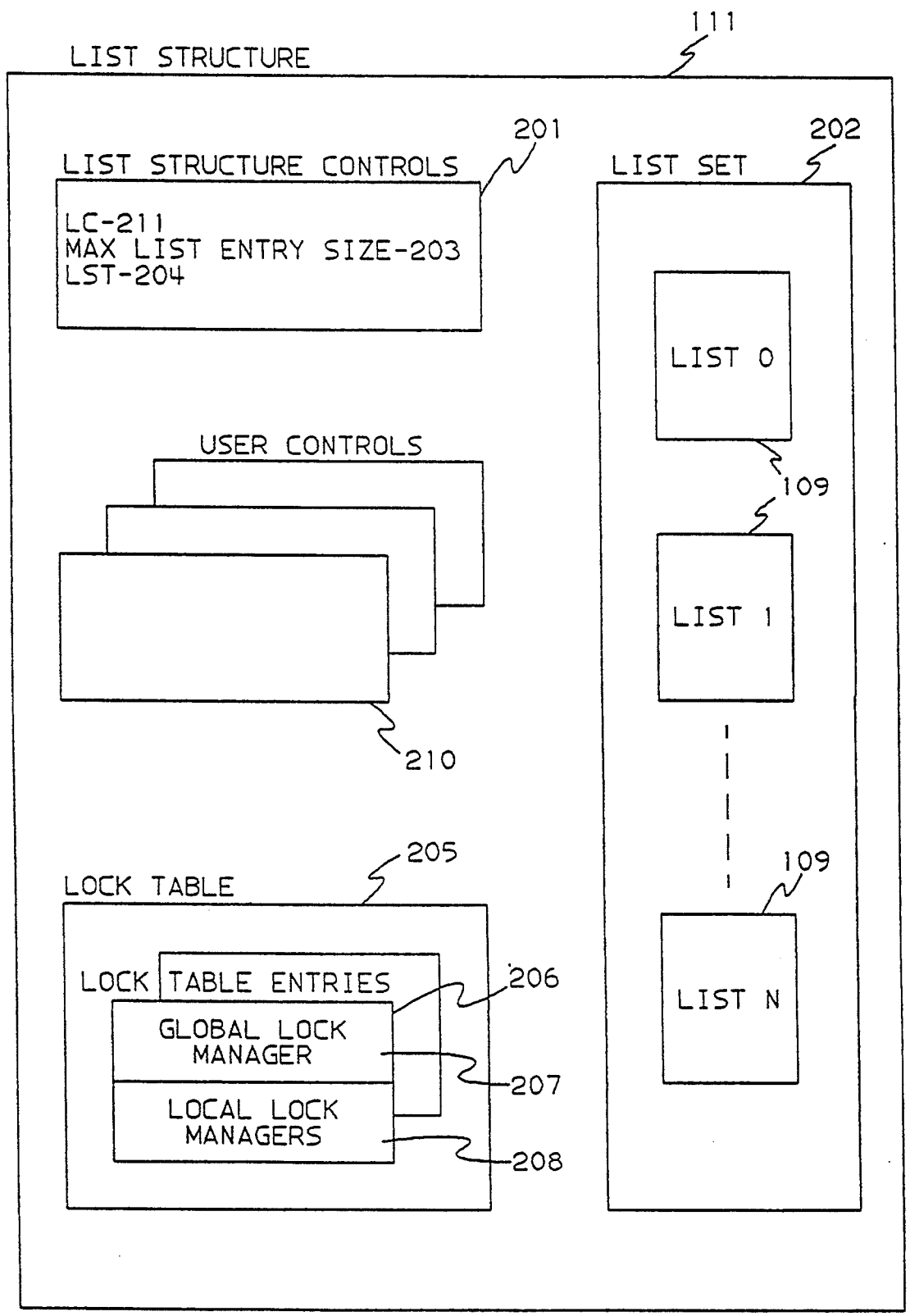
FIG. 2 is a block diagram illustrating the overview structure of a List Structure in the SES facility.

The fixed list-structure controls are summarized in the following table. (Those that are key to the present invention are shown in FIG. 2.)

| Fixed List-Structure Controls | Acronym |
| --- | --- |
| List count | LC |
| List-element characteristic | LELX |
| List-structure type | LST |
| Lock-table-entry characteristic | LTEX |
| Lock-table-entry count | LTEC |
| Maximum data-list-entry size | MDLES |
| Maximum list-set-element count | MLSELC |
| Maximum list-set-entry count | MLSEC |
| Structure size | SS |

The program-modifiable list-structure controls are summarized in the following table.

| Program-Modifiable List-Structure Controls | Acronym |
| --- | --- |
| List-set-element count | LSELC |
| List-set-entry count | LSEC |
| Nonzero-lock-table-entry count | NLTEC |
| User-identifier vector | UIDV |
| User-structure control | USC |

Note that in the definition of the terms below, the convention "<aaa>" is used in many of the figure references for defined terms. The arrow brackets "<>" indicate list structure usage of the defined term as a response operand on a list structure command. The "aaa" is the block number reference in the drawings attached to this specification. (2XX indicates FIG. 2; 3XX indicates FIG. 3; 4XX indicates FIG. 4; etc.)

List Count (LC): 211 433 <488>
  An object or field that specifies the number of lists created.
List-Element Characteristic (LELX): 462 <485>
  An object or field that specifies the number of bytes in each list element.
List-Set-Element Count (LSELC): <490>
  An object or field that specifies the number of list elements that have been assigned to list entries or retry-data blocks, or both, in the list set.
List-Set-Entry Count (LSEC): <492>
  An object or field that specifies the number of existing list entries in the list set.
List-Structure Type (LST): 204 447 <483>
  An object or field that indicates the list objects created on allocation. A field contains a counter indicator (CI), a lock indicator (LI), a data indicator (DI), an adjunct indicator (AI), a name indicator (NI), and a key indicator (KI).
  The counter indicator specifies that either:
    a list-entry count and list-entry-count limit are defined or
    a list-element count and list-element-count limit are defined.
  The lock indicator specifies whether or not a lock table is created.
  The data and adjunct indicators specify whether:
    no list set is created,
    list entries have adjunct only,
    list entries have data only, or
    list entries have data and adjunct in the list entries.
  The name indicator specifies whether or not list entries are named.
  The key indicator specifies whether or not the list entries are keyed.
Lock-Table-Entry Characteristic (LTEX): 425 <484>
  An object or field that specifies the number of bytes in each lock-table entry.
Lock-Table-Entry Count (LTEC): 427 <487>
  An object or field that specifies the number of lock-table entries allocated.

Maximum Data-List-Entry Size (MDLES): 437 <4B3>
: An object or field that specifies the maximum size of the data list entry.

Maximum List-Set-Element Count (MLSELC): <481>
: An object or field that specifies the maximum number of list elements that are available for assignment to list entries or retry-data blocks, or both, in the list set.

List-Set-Entry Count (MLSEC): <480>
: An object or field that specifies the maximum number of possible list entries in a list set.

Nonzero-Lock-Table-Entry Count (NLTEC): <491>
: An object or field that specifies the number of nonzero lock-table entries that exist in the structure.

Structure Size (SS): 466 <482>
: An object or field that specifies the amount of storage allocated.

User-Identifier Vector (UIDV): <495>
: An object or field that specifies the assigned UIDs.

User Structure Control (USC): 467 <494>
: A field per structure defined by the user.

User Controls (210)
: The user controls are created and initialized when a list-structure user is assigned and are deleted when the list-structure user is unassigned.

The user controls are summarized in the following table.

| User Controls | Acronym |
|---|---|
| List-notification token | LNT |
| System identifier | SI |
| User-attachment control | UAC |

List-Notification Token (LNT): 441
: A value that specifies a list-notification vector to the system.

System Identifier (SI): <456>605 termed LNSID
: A value specified by the program when a message path is activated. The system identifier is maintained in the message-path status vector and copied into the user controls when an attach-list-structure-user command is communicated over the message path.

User-Attachment Control (UAC): 475 <499>
: A field per attached user defined by the user.

List Controls (314)
: There is a list-controls object for every list created in a list structure. All the list controls except the list-entry-count limit and the list-element-count limit are initialized to zero when the list structure is created.

Figure 3:
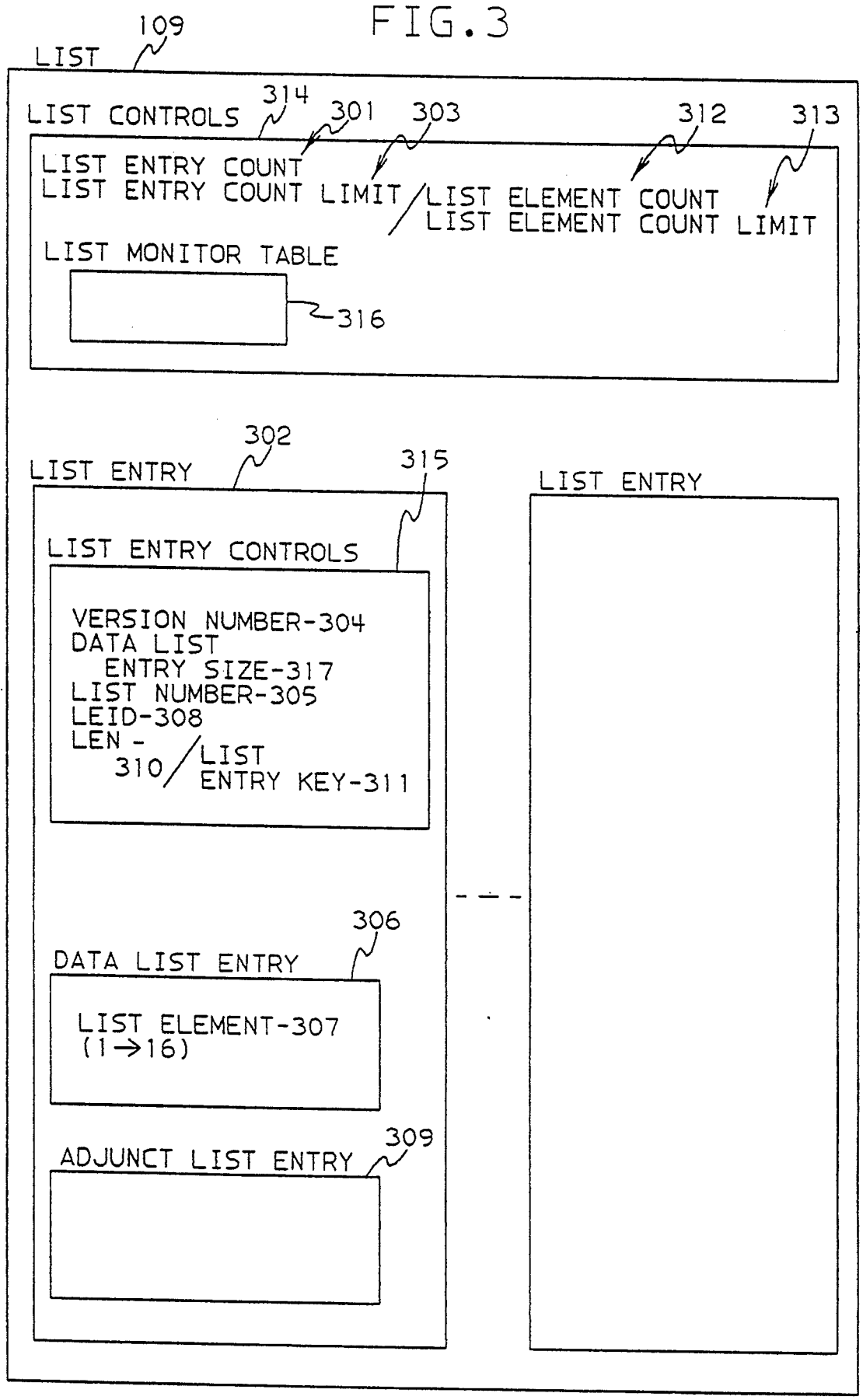
FIG. 3 is a block diagram illustrating the structure of a List object in the SES facility.
Figure 4A:
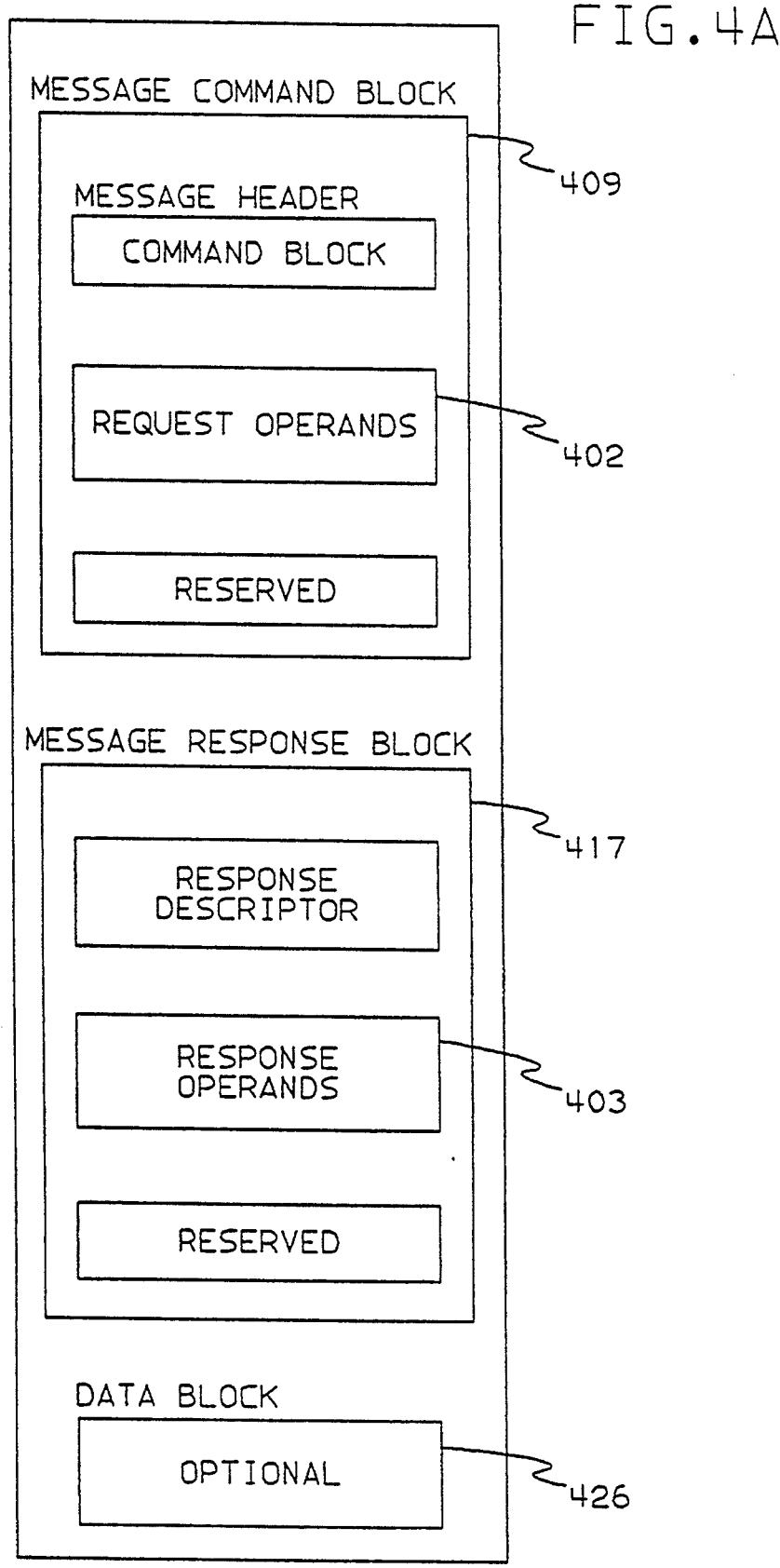

The list controls are summarized in the following table. (Significant controls are illustrated in FIG. 3.)

| List Controls | Acronym |
|---|---|
| List-element count | LELC |
| List-element-count limit | LELCL |
| List-entry count | LEC |
| List-entry-count limit | LECL |
| List-monitor table | LMT |
| List-state-transition count | LSTC |
| User list control | ULC |

List-Element Count (LELC): 312 <4B2>

An object or field that specifies the number of list elements currently in the list.

List-Element-Count Limit (LELCL): 313 4AA <4B4>
: An object or field that specifies the maximum number of possible list elements in a list. This object is initialized to the maximum list-set-element count when a list structure is created.

List-Entry Count (LEC): 301 <446>
: An object or field that specifies the number of list entries currently in the list.

List-Entry-Count Limit (LECL): 303 469 <459>
: An object or field that specifies the maximum number of possible list entries in a list. This object is initialized to the maximum list-set-entry count when a list structure is created.

List-State-Transition Count (LSTC): <4B1>
: An object or field that specifies the number of empty to not-empty list-state transitions that have occurred.

User List Control (ULC): 472 <497>
: A field per list defined by the user.

List-Monitor Table (316)
: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object.

List-Monitoring-Active Bit (LMAB): 608
: An object or field that specifies whether the user associated with the list-monitor-table entry is monitoring the list-state transitions of the list.

When a user is not monitoring a list, all previously issued list-notification commands on behalf of the associated user for this list are complete.

List-Notification-Request Type (LNRT): 445 602
: An object or field that indicates whether the list-notification-vector summaries are to be updated when an empty to not-empty state transition occurs on a monitored list.

List-Notification-Entry Number (LNEN): 442 603
: An object or field that specifies a list-notification-vector entry.

List-Entry Controls (315)
: There is a list-entry-controls object for every list entry within a structure. The list-entry controls are initialized when a list entry is created and are deleted when the list entry is deleted.

The list-entry controls are summarized in the following table.

| List-Entry Controls | Acronym |
|---|---|
| Data-list-entry size | DLES |
| List-entry identifier | LEID |
| List-entry key/list-entry name | LEK/LEN |
| List number | LN |
| Version number | VN |

Data-List-Entry Size (DLES): 317 436 <451>

An object or field that specifies the size of the data list entry.

List-Entry Identifier (LEID): 308 404 <410>
An object or field that designates the list entry. A list-entry identifier is unique to a list set and is assigned by the SES.

List-Entry Key (LEK): 311 428 <449>
An object or field that partially designates the position of the list entry in the list.

List-Entry Name (LEN): 310 405 <448>
An object or field that fully designates the position of the list entry in the list set. A list-entry name is unique to a list set at any particular instant and is provided by the program.

List Number (LN): 305 423 <430>
An object or field which designates the list that the list entry is in.

Version Number (VN): 304 411 <408>
An object or field that is conditionally compared and conditionally updated. The version number is initialized to zero when a list entry is created.

Lock Table (205)
The lock table is a sequence of objects, called lock-table entries <455>. The number of lock-table entries is determined when the table is created. The lock-table entries are numbered from zero to the lock-table-entry count less one. For a specific lock table, the entries have one size which is a power of 2 in the range of 1 to the maximum lock-table-entry size. The size of the largest lock table is limited by the free space and the size of all the controls required to support the list structure.

Each lock-table entry <455> has a global-lock-manager (GLM 207) object and an optional local-lock-managers (LLM 208) object.

A lock-table entry whose size is one byte has only a global-lock-manager object. When a lock-table-entry size is greater than one byte, the leftmost byte is the global-lock-manager object, and the remaining bytes form the local-lock-managers object. Lock tables with an entry size of one byte do not support local-lock managers. Lock tables with an entry size of at least two bytes do support local-lock managers.

The global-lock-manager object of a lock-table entry contains a field called a user identifier.

The local-lock-managers object of a lock-table entry contains a string of local-lock bits, where each bit represents a user identifier.

The lock-table objects have a value of zero when the table is allocated and may be modified by subsequent commands.

List Set (202)
The list set is a sequence of objects, called lists. The number of lists is determined when a list set is created. The lists are numbered from zero to the list count less one.

List (109)
A list is a sequence of objects, called list entries (302). The number of possible entries is determined when the list structure is created.

A list entry may also act as a retry-data block.

The relative position of a list entry in the sequence is determined when the entry is created and may be changed when any list entry is created, deleted, or moved.

A list entry is located by means of a list-entry identifier, list-entry name, or by position. The size of the largest list is limited by the free space and the size of all the controls required to support the list structure.

A list entry has up to two objects: a data list entry (306) and an adjunct list entry (309) 434 <4A1>, depending on the list-structure type.

A data-list entry consists of from one to MDLES list elements. The data-list-entry size is determined when the data-list entry is written. The adjunct-list-entry size is static.

A list entry exists when it is created and ceases to exist when it is deleted.

LIST STRUCTURE OPERANDS

The storage objects and processes are accessed using commands issued by the program. Each list-structure command has three parts:

A message-command block containing:
Message header
Request operands
Reserved area A message-response block containing:
Response descriptor
Response operands
Reserved area An optional data block, depending on the command The command descriptions contain the formats of the message-command blocks, message-response blocks, and data blocks.

This section defines the list-structure operands, except for those operands that are also objects. Operands that are also objects can be found under "Global Objects" or "List Structure Objects", with a FIG. 4 reference number beside them (indicating their use as either request or response operands).

Comparative Global-Lock Manager (CGLM): 415
A value that is compared to the global-lock-manager object.

Comparative Version Number (CVN): 421
A value that is compared to the version-number object.

Current Data Index (CDI): <4B0>
A value that indexes to the current list-entry name or list-entry identifier in the data block for the delete-list-entries command.

Data-Block Size (DBS): 4A3
A value that specifies the size of the data block.

Delete-Entries-Locator Type (DELT): 440 <4A6>
A value that indicates whether a list entry is located by list-entry identifier or list-entry name and whether or not the list numbers are compared for the delete-list-entries command.

Delete-List-Entries Count (DLEC): <4A7>
A value that specifies the number of deleted list entries.

Direction (DIR): 406
A value that indicates how the positions of the list entries are numbered relative to a designated position. The direction is either left to right, or right to left.

Entry-to-Element Ratio (ETELR): 461 <486>
A field consisting of two unsigned binary integers that specify the target for the relative number of list entries to list elements possible in the list set.

The integer specified in the first field divided by the sum of the two numbers represents the fraction of the total of the maximum list-set-element and the maximum list-set-entry count that consists of list entries. The integer specified in the second field divided by the sum of the two numbers represents the fraction of the total of the maximum list-set-element and the maximum list-set-entry count that consists of list elements associated with data list entries and retry-data blocks.

Ending Data Index (EDI): 4A9
  A value that indexes to the last list-entry name or list-entry identifier in the data block for the delete-list-entries command.

Entry-Locator Type (ELT): 429
  A value that indicates how a list entry is located for a read, replace, or delete operation, or as the source of a move operation, and whether list-number comparison is requested. The list entry is located by list-entry identifier, list-entry name, unkeyed position or keyed position.
  For a create or the target of a move operation, the target list-entry position is located by keyed position when the entries are keyed, or by unkeyed position when the entries are not keyed.

Key-Request Type (KRT): 439
  A value that indicates how a keyed list entry is located when an entry is replaced, moved, read or deleted. The type determines the relationship between the list-entry-key object and the list-entry-key operand.

---
  00 Equals list-entry-key operand
  01 Less than or equal to the list-entry-key operand
  10 Greater than or equal to the list-entry-key operand
  11 Invalid
---

The key-request type is ignored when the entry-locator type is ignored or when the entries are not located by list-entry key.

List-Control Type (LCT): 468
  The list-control type specifies either (1) the list-element-count or list-entry-count limit is written, depending on the counter indicator or (2) the user list control, both or neither are written.

List-Entry Type (LET): 435
  A value that indicates whether data list entries, adjunct list entries, or both are read or replaced upon normal completion of the command execution.

Local-Lock Managers (LLM): 416
  A value which identifies users with local interest in the lock-table entry.

Local-Lock Bit (LLB): 413
  A value that is written to a local-lock manager.

Lock-Request Type (LRT): 412
  A value that indicates the type of lock request. The lock request type specifies
  (1) that No lock process is requested,
  (2) to compare the global-lock managers,
  (3) to replace the global-lock manager,
  (4) to replace a local-lock manager,
  (5) to replace the global-lock and local-lock managers.

Lock-Table-Entry Number (LTEN): 414 <431>
  A value that specifies an entry in a lock table.

Move-Entry-Locator Type (MELT): 479
  A value that indicates which key is used when a keyed list entry is moved.
  The move-entry-locator type specifies whether the target key is the LEK in the list entry or the TLEK in the MCB.

Read-List-Entries Count (RLEC): <4A2>
  A value that specifies the number of list entries read.

Read-List Type (RLT): 4AB
  A value that indicates whether list-entry controls, data, list entries, adjunct list entries, or any combination are read upon normal completion of the command execution.

Response Code (RC): 407
  The response code indicates the result of executing a list command.

Restart Token (RT): 4A4 <4A5>
  A value that controls the reading or deleting of list entries on the read-list-set and delete-list-set commands.

Retry Index (RX): 4AC
  A VALUE that designates either a particular retry buffer or none.

Retry Version Number (RVN): 4AD <4A0>
  A value that specifies the version number stored in the retry buffer.

Starting Data Index (SDI): 4A8
  A value that indexes to the first list-entry name or list-entry identifier in the data block for the delete-list-entries command.

Target Direction (TDIR): 478
  A value that indicates how the positions of the list entries are numbered relative to a designated target position for a moved list entry. The target direction is either left to right or right to left.

Target List-Entry Key (TLEK): 452
  A value that partially specifies the targeted position to which a list entry is moved.

Target List Number (TLN): 453
  A value that designates the list to which a list-entry is moved.

User Identifier (UID): 418 <419>
  A value that identifies a user.
  When the lock-request type specifies global-lock-manager and local-lock-managers replacement, the user identifier specifies a global-lock manager. When the lock-request type specifies global-lock-manager replacement, the user identifier specifies a global-lock manager and, when local-lock managers exist, it also specifies a local-lock manager. When the lock-request type specifies local-lock-manager replacement, The user identifier specifies a local-lock manager.

Version-Request Type (VRT): 422
  A value that indicates the type of version-number request to (1) compare the version numbers or (2) to increment, decrement, or replace the version number, or both, or neither.

Write-Request Type (WRT): 420
  A value that indicates the type of write request. The writer-request type specifies
  (1) to replace a list entry,
  (2) to Create a list entry, or
  (3) to replace or create a list entry.

LIST STRUCTURE PROCESSES

The following processes may be invoked by the SES list-structure commands. The set of processes invoked by a command are listed in the command description.

Allocating a List Structure
  The user structure control is updated on the allocate-list-structure command. A list structure is created on the first successful invocation of the allocate-list-structure command for a structure that does not already exist. A list structure is initially allocated after one or more successful invocations of the allocate-list-structure command. These operations are referred to generically as list-allocation processes.

Creating a List Structure

When a list structure is created, the list-structure type determines the attributes of the created structure. The list-structure type has indicators for each of the following: counters, locks, data, adjunct, name, and key.

When the counter indicator in the list-structure type specifies that the list-entry count and list-entry-count limit are defined and allocation is successful, the list controls for each list contain a list-entry count and a list-entry-count limit. When the counter indicator in the list-structure type specifies that the list-element count and list-element-count limit are defined and allocation is successful, the list controls for each list contain a list-element count and a list-element-count limit.

When the lock indicator in the list-structure type specifies that a lock table is created and allocation is successful, a lock table is created with a width as specified by the lock-table-entry characteristic and a length as specified by the lock-table-entry count.

When the data indicator in the list-structure type specifies that list entries have data and allocation is successful, storage is allocated for the creation of list elements. The size of the list elements is specified by the list-element characteristic.

When the adjunct indicator in the list-structure type specifies that list entries have adjunct and allocation is successful, each list entry created in the structure has an adjunct list entry.

When the name indicator in the list-structure type specifies that the list entries have names and allocation is successful, each list entry created in the structure has a list-entry name associated with it.

When the key indicator in the list-structure type specifies that the list entries have keys and allocation is successful, each list entry created in the structure has a list-entry key associated with it.

When a list structure is created, (1) the free-space and free-control-space global controls are updated, (2) the appropriate field in the structure-identifier vector is set, and (3) the list-structure and list controls are initialized.

Deallocating a List Structure

When a list structure is deallocated, the storage is freed, the free-space and free-control-space global controls are updated, the appropriate field in the structure-identifier vector, and all the list-monitoring-active objects are reset.

Attaching a List-Structure User

A list-structure user is attached by means of the attach-list-structure-user command.

When a list-structure user is attached, the user controls are initialized, the appropriate field in the user-identifier vector is updated, and the user is placed in the attached state.

Detaching a List-Structure User

A list-structure user is detached after one or more successful invocations of the detach-list-structure-user command.

When a list-structure user is detached, the list-monitoring-active object has been updated in all the list-monitor-table entries associated with the user. The user controls are deleted and the assigned field in the user-identifier vector is updated.

The list-monitoring-active bit is updated only after all list-notification commands issued to the associated list and user are complete.

Comparing Global-Lock Managers

Global-lock-manager comparison always occurs before a lock-table entry is written or may occur before a list entry is created, replaced, read, moved or deleted, depending on the command and lock-request type.

The global-lock-manager object is compared with the comparative-global-lock manager specified. When they match, the global-lock-manager comparison succeeds, and the command continues. When they do not match, the global-lock-manager comparison fails, and an indicative response code is returned.

Comparing Local-Lock Managers

Local-lock-manager comparison may occur before a lock-table entry is written or before a list entry is created, replaced, read, moved or deleted, depending on the command code and lock-request type.

There are two lock-request types that cause local-lock-manager comparison: global-lock-manager replacement, and local-lock-manager replacement.

When a local-lock-manager object exists and a global-lock-manager replacement is requested, the local-lock-manager-object value is ANDed with a mask of all ones except for the local-lock bit corresponding to the user identifier specified. This ANDed value is then compared with zero. When they match, the local-lock-manager comparison succeeds. When they do not match, the local-lock-manager comparison fails.

When a local-lock-manager object exists and a local-lock-manager replacement is requested, the local-lock bit corresponding to the user identifier specified is compared with the local-lock-bit value specified. When they match, the local-lock-manager comparison fails. When they do not match, the local-lock-manager comparison succeeds.

When the local-lock-manager comparison fails, an indicative response code is returned.

Writing a Lock-Table Entry

One or both of the objects contained within a lock-table entry may be replaced, depending on the lock-request type specified.

A global-lock manager may be replaced when a lock-request type specifies to replace the global-lock-manager or to replace the global-lock and local-lock managers and the global-lock-manager comparison succeeds.

One or more local-lock managers are replaced when a lock-request type specifies to replace a local-lock-manager or to replace the global-lock and local-lock managers and the global-lock-manager comparison succeeds.

Replacing a Global-Lock Manager

The global-lock-managers are compared and the local-lock-managers may be compared when global-lock-manager replacement is requested.

When the global-lock-manager comparison succeeds, the global-lock manager may be replaced with the user identifier specified, regardless of whether or not the local-lock-manager comparison succeeds.

Replacing a Local-Lock Manager

The global-lock-managers and local-lock-managers are compared when local-lock-manager replacement is requested.

When the global-lock-manager comparison succeeds, the local-lock bit corresponding to the user identifier specified may be replaced with the local-lock-bit value specified, regardless of whether or not the local-lock-manager comparison succeeds.

Replacing the Global-Lock and Local-Lock Managers

The global-lock-managers are compared when global-lock and local-lock-managers replacement is requested.

When the global-lock-manager comparison succeeds, the global-lock manager may be replaced with the user identifier specified and the local-lock managers are replaced with the local-lock managers specified.

Locating a List Entry or List-Entry Position

The designated list entry is the first entry relative to the designated position before an entry is deleted, when an entry is read, replaced or moved, or after an entry is created. The designated position is specified (1) by an unkeyed position, (2) by a keyed position, (3) by a list-entry identifier, or (4) by a list-entry name, depending on the entry-locator type specified and the type of structure allocated.

A list entry is located by unkeyed position when an entry-locator type specifies locate by unkeyed position or an unkeyed list entry is created or moved; that is, the designated position is specified by means of a list number and a direction. A list entry is located by keyed position when the list entries are keyed and an entry-locator type specifies locate by keyed position or a keyed list entry is created or moved; that is, the designated position is specified by means of a list number, direction, and a list-entry key. A list entry is located by list-entry identifier when an entry-locator type specifies locate by list-entry identifier; that is, the designated position is the position of the identified list entry. A list entry is located by list-entry name when the list entries are named and an entry-locator type specifies locate by list-entry name; that is, the designated position is the position of the named list entry.

A list entry has a position relative to the designated position. When a list entry is created, moved, or deleted, the relative positions of the successive list entries are changed. In these cases, the first entry is the designated list entry and successive entries are determined by the direction specified.

Regardless of how a list entry is located, when a left-to-right direction is specified, the last entry is the rightmost entry in the list, and when a right-to-left direction is specified, the last entry is the leftmost entry in the list.

When a list entry is located by list-entry identifier, the designated list entry is the identified list entry.

When a list entry is located by list-entry name, the designated list entry is the named list entry.

When a list entry is located by unkeyed position and a left-to-right direction is specified, the designated list entry is the leftmost entry in the list. When a list entry is located by unkeyed position and a right-to-left direction is specified, the designated list entry is the rightmost entry in the list.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a left-to-right direction is specified, then the designated source list entry is the leftmost entry with a key equal, with the largest key less than or equal, or with the smallest key greater than or equal to the specified list-entry-key request operand.

When (1) a list entry is located by keyed position, (2) entry deletion, read, replacement or movement is requested, (3) a list entry with an equal key, a less than or equal key, or a greater than or equal key, exists on the list, depending on the key-request type, and (4) a right-to-left direction is specified, then the designated list entry is the rightmost entry with a key equal, with the largest key less than or equal, or with the smallest key greater than or equal to the specified list-entry-key request operand.

When (1) a list entry is located by keyed position, (2) entry creation or movement is requested, (3) a list entry with an equal key exists on the list, (4) a left-to-right direction is specified, then the designated target position is the position of the leftmost entry with the same key.

When (1) a list entry is located by keyed position, (2) entry creation or movement is requested, (3) a list entry with an equal key exists on the list, (4) a right-to-left direction is specified, then the designated target position is the position of the rightmost entry with the same key.

When (1) a list entry is located by keyed position, (2) entry creation or movement is requested, and (3) all entries on the list have a key greater than the specified key, the designated target position is the leftmost position in the list.

When (1) a list entry is located by keyed position, (2) entry creation or movement is requested, (3) at least one list entry on the list has a key less than the specified key, and (4) there is no list entry in the list that matches the specified key, then the designated target position is the first position after the rightmost entry with a key less than the specified list-entry key in the list.

When a list entry is located by list-entry identifier or by list-entry name, the designated position exists when the list entry exists.

When a list entry is located by unkeyed position, the designated position exists when the list exists.

When a list entry is located by keyed position and entry creation or movement is requested, the designated target position exists when the list exists.

When a list entry is located by keyed position and entry creation is not requested, the designated position exists when a list entry in the list has a key that is equal, greater than or equal, or less than or equal to the specified list-entry key in the list, depending on the key-request type.

When the designated position does not exist, an indicative response code is returned.

Comparing List Numbers

When the of the entry-locator type specifies list-number comparison and a list entry is not created, a list-number comparison is requested.

When list-number comparison is requested, the list-number object is compared with the list number specified. If they do not match, the list-number comparison fails, and an indicative response code is returned.

Comparing Counts

There are three sets of counts that are compared, depending on the process requested: the list-set-entry counts, the list-set-element counts, and the list entry counts or list-element counts, depending on the count indicator.

Comparing List-Element Counts

The list-element-count-limit object is compared with the list-element-count operand whenever a list entry is written or moved and the count indicator in the list-structure type is one. If the sum of the list-element count and the number of additional list elements required exceeds the list-element-count limit, the list is full. When the list is full and a write or move operation is requested, an indicative response code is returned.

The list-element-count limit or list-entry-count limit is updated on a write-list-controls command, depending on the list-control type.

Comparing List-Entry Counts

The list-entry-count-limit object is compared with the list-entry-count operand whenever a list entry is created or moved and they exist. A list is full when the number of list entries created matches or exceeds the list-entry-count limit. When the list is full and a create or move operation is requested, an indicative response code is returned.

Comparing List-Set-Element Counts

The maximum list-set-element-count object is compared with the list-set-element-count object whenever a data list entry is written. If the sum of the list-set-element count and the number of additional list elements required exceeds the maximum-list-set-element count, the list set is full. When the list set is full, and list-entry creation or retry-data block creation is requested, an indicative response code is returned.

Comparing List-Set-Entry Counts

The maximum list-set-entry-count object is compared with the list-set-entry-count object whenever a list entry is created. A list set is full when the number of list entries created and not deleted matches the maximum list-set-entry count. When a list set is full and list-entry creation or retry-data block creation is requested, an indicative response code is returned.

Updating Counts

There are three types of counts that are updated, depending on the process requested: the list-set-entry count, the list-set-element count, and the list-entry count or list-element count, depending on the count indicator.

Updating the List-Element Counts

The list-element counts are updated whenever a list entry is created, deleted, or moved to another list or replaced and the number of list elements associated with the list entry is changed or a retry-data block is created or deleted. When the list entry is also the retry-data block, the count is at most incremented or decremented by the number of list elements associated with the list entry.

Updating the List-Entry Counts

The list-entry counts are updated whenever they and a list entry is created, deleted, or moved to another list.

Updating the List-Set-Element Count

The list-set-element count is updated whenever a list entry is created, deleted, or replaced and the number of list elements associated with the list entry is changed or a retry-data block is created or deleted. When the list entry is also the retry-data block, the count is at most incremented or decremented by the number of list elements associated with the list entry.

Updating the List-Set-Entry Count

The list-set-entry count is updated whenever a list entry is created or deleted.

Comparing Version Numbers

Version numbers may be compared when an entry is replaced, read, moved, or deleted, depending on the version-request type specified. When a version-request type specifies to compare the version numbers, the version-number object is compared with the comparative-version-number request operand. When they match, processing continues. When they do not match, the version-number comparison fails, and an indicative response code is returned.

Updating a Version Number

A version number may be updated when an entry is created, replaced, read, or moved, depending on the version-request type specified.

When a version-request type of specifies to decrement the version number, the version number is decremented by one. When a version-request type specifies to increment the version number, the version number is incremented by one. When a version-request specifies to replace the version number, the version-number object is set to the version-number request operand.

Writing a List Entry

A list entry may be written on a write-list-entry or a write-and-move-list-entry command. A list entry is written when an entry is created or replaced.

When a list entry is created, the data and adjunct indicators within the list-structure-type object are used to determine whether or not to write the data or adjunct list entry, or both. When a list entry is replaced, the data and adjunct indicators within the list-entry-type operand are used to determine whether or not to write the data or adjunct list entry, or both.

When the data indicator specifies that the list entries have data, the data list entry is written from the data block. When the adjunct indicator specifies that the list entries have adjunct, the adjunct list entry is written from the adjunct-list-entry-value request operand.

When the data list entry is replaced and the data-list-entry-size operand is smaller than the data-list-entry-size object, the data-list entry is contracted to the new size, the data block is stored in the data-list entry, and the data-list-entry-size object in the list-entry controls is updated with the value of the data-list-entry-size operand. When the data list entry is replaced and the data-list-entry-size operand is larger than the data-list-entry-size object, the data-list entry is expanded to the new size, the data block is stored in the data-list entry, and the data-list-entry-size object in the list-entry controls is updated with the value of the data-list-entry-size operand.

Creating a List Entry

List-entry creation is requested on a write-list-entry command, depending on the write-request type specified.

When a write-request type specifies to create a list entry, list-entry creation is unconditionally requested. When a write-request type specifies to replace or create a list entry, list-entry creation is conditionally requested; that is, the list-entry creation is requested when the designated list entry does not exist.

When the list set and list is not full and list-entry creation is requested, a list entry may be created. When a list entry is created, the list-set-entry count and when it exists, the associated list-entry count are each incremented by one. When a list entry is created, the list-set-element count and when it exists, and the associated list-element count are each increased by the value of the data-list-entry size.

A list entry is created at the first entry position relative to the designated position, and the relative position of all succeeding entries is increased by one.

Replacing a List Entry

A list entry may be replaced on a write-list-entry command.

When a write-request type specifies to replace a list entry or to replace or create a list entry and the designated list entry exists, the list entry may be replaced.

When a list entry is replaced, the list-set-element count and when it exists, the associated list-element count are each increased or decreased by the change in the data-list-entry size.

The position of an entry is not affected when it is replaced.

When a write-request type specifies to replace a list entry and the designated list entry does not exist, an indicative response code is returned.

Reading a List Entry

A list entry may be read on a read-list-entry, move-and-read-list-entry, or read-and-delete-list-entry command, and one or more list entries may be read on a read-list or read-list-set command.

When the list-entry type specifies data list entries, one or more data list entries may be read into the data area, depending on the command executed. When the list-entry type specifies adjunct list entries, one adjunct list entry may be read into the adjunct-list-entry-value response operand, or one or more adjunct list entries are read into the data area, depending on the command executed.

When a read-list or read-list-set command is executed, the adjunct or data list entries are always read into the data area. Otherwise, when any other command that does a read operation is executed, the adjunct list entry is read into the response operand.

The position of an entry is not affected by a read operation.

Moving a List Entry

A list entry may be moved on a move-list-entry, a write-and-move-list-entry, or a move-and-read-list-entry command. List entries may be moved between lists or to the same list within a list set.

A list entry is moved from the first entry position relative to the designated position, and the relative position of all succeeding entries is decreased by one. A list entry is moved to the first entry position relative to the targeted position, and the relative position of all succeeding entries is increased by one.

When a list entry is moved from one list to another and list-entry counts exist, the list-entry count of the source list is decremented by one and the list-entry count of the target list is incremented by one.

When a list entry is moved from one list to another and list-element counts exist, the list-element count of the source list is decreased by the value of the data-list-entry size and the list-element count of the target list is increased by the same amount.

Deleting a List Entry

A list entry may be deleted on a delete-list-entry or a read-and-delete-list-entry command and one or more list entries may be deleted on a delete-list-set or delete-list-entries command.

An entry is deleted at the first entry position relative to the designated position, and the relative position of all succeeding entries is decreased by one.

When a list entry is deleted, the list-set-entry count and when list-entry counts exist, the associated list-entry count are each decremented by one.

When a list entry is deleted, the list-set-element count and when list-element counts exist, and the associated list-element count are each decreased by the value of the data-list-entry size.

Writing the Retry Buffer

When the retry index specifies a retry buffer, the retry-version-number request operand and all the response operands except for the response descriptor are stored in the retry-information portion of the retry buffer specified by the retry index. When the retry index specifies a retry buffer and a data list entry is read, the data list entry is also stored in the retry-data-block portion of the retry buffer specified by the retry index.

Notifying a List Monitor

Processing of a list-notification command consists of three operations; message-path selection, initiation, and completion.

When a list-state transition occurs, one or more list-notification commands are initiated for each user who is monitoring the list to the system which attached the user. All the list-notification commands initiated as a result of a list-state transition are initiated before the command that caused the list-state transition is completed.

The list-notification command provides the information necessary for the system to update one list-notification entry and, when requested, the associated list-notification summaries, to reflect the new list state.

A user becomes a list monitor by registering with the list by means of the register-list-monitor command. A user ceases to be a list monitor by deregistering from the list by means of the deregister-list-monitor command or by detaching from the list structure by means of the detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

This section defines the list-structure operands for the list notification command.

| List-Notification Operands | Acronym |
|---|---|
| Non-empty state change | NESC |
| List-notification-entry number | LNEN |
| List-notification token | LNT |
| Summary update | SU |

Non-empty State Change (NESC): 443
  A value that indicates that the list transition from the associated list notification bit vector entry was either an empty to not-empty transition (value is one) or a not-empty to empty transition (value is zero).

List-Notification-Entry Number (LNEN): 442
  An object or field that specifies a list-notification-vector entry.

List-Notification Token (LNT): 441
  A value that specifies a list-notification vector to the system.

Summary Update (SU): termed LNRT 445
  A value that indicates whether the list-notification-vector summaries are to be updated when an empty to not-empty state transition occurs on a monitored list.

List structure commands
  This section summarizes the list structure commands that are supported by the SES facility 110. List structure commands are direct commands which are communicated from the CPC 101-104 to the message processing function 113 of the SES via the Send Message CPU instruction. List structure commands are categorized as follows:

Structure commands which allocate, read, and write list structures 111, list structure controls 201, and list controls 314.

User commands which allow a user (program) to identify itself to the SES, and to register as a monitor of specific lists 109 in the SES.

Lock only commands which support read, write, and clear operations on lock table objects 206.

Single-list-entry commands which support read, write, move and delete operations on one list entry object 302.

Multiple-list-entry commands, which support read and delete operations on multiple list objects/entries 302.

Structure commands

The structure commands are:
Allocate-list-structure (ALST),
Deallocate-list-structure (DLST),
Read-list-structure-controls (RLSC),
Read-list-controls (RLC), and
Write-list-controls (WLC).

ALST Command

The ALST command creates (allocates) a list structure 111.

The allocate-list-structure command creates a list structure when the structure identifier is not assigned and there is sufficient free space and sufficient free control space available in the SES for creating the requested lock-table entries, lists and associated controls, and at least one list entry when a list set is requested.

The allocate-list-structure command continues the initial allocation of a list structure when the structure identifier is assigned and initial allocation of the structure has not completed.

When the structure is allocated, a checkpoint is established and the maximum list-set-entry count, maximum list-set-element count, allocated structure size and an indicative response code are returned in the response operands.

When a model-dependent time period has elapsed before the allocation process is completed, the maximum list-set-entry count, maximum list-set-element count, allocated structure size and an indicative response code is returned in the response operands.

When insufficient free control space but sufficient free space is available in SES for the structure, an indicative response code is returned in the response operand.

When insufficient free space is available in SES for the structure, an indicative response code is returned in the response operand.

When the initial allocation of the list structure has not completed, the initial allocation is continued.

DLST Command

The DLST command deallocates the list structure 111 associated with the specified structure identifier. The designated list structure is deallocated and an indicative response code is returned in the response operand. When a model-dependent time period has elapsed before the deallocation process is completed, an indicative response code is returned in the response operand.

RLSC Command

The RLSC command returns (in the response operands) the list-structure controls 201 associated with the specified structure identifier.

RLC Command

The RLC command returns (in the response operands) the list controls 314 associated with the specified structure identifier and list number.

WLC Command

The WLC command writes/updates the list controls 314 associated with the specified structure identifier and list number.

The write-list-controls command writes the list controls, depending on the list-control type.

User commands

The user commands are:
Attach-list-structure-user (ALSU),
Detach-list-structure-user (DLSU),
Register-list-monitor (RLM),
Deregister-list-monitor (DLM), and
Read-user-controls (RUC).

ALSU Command

The ALSU command executes the attachment process.

Figure 14:
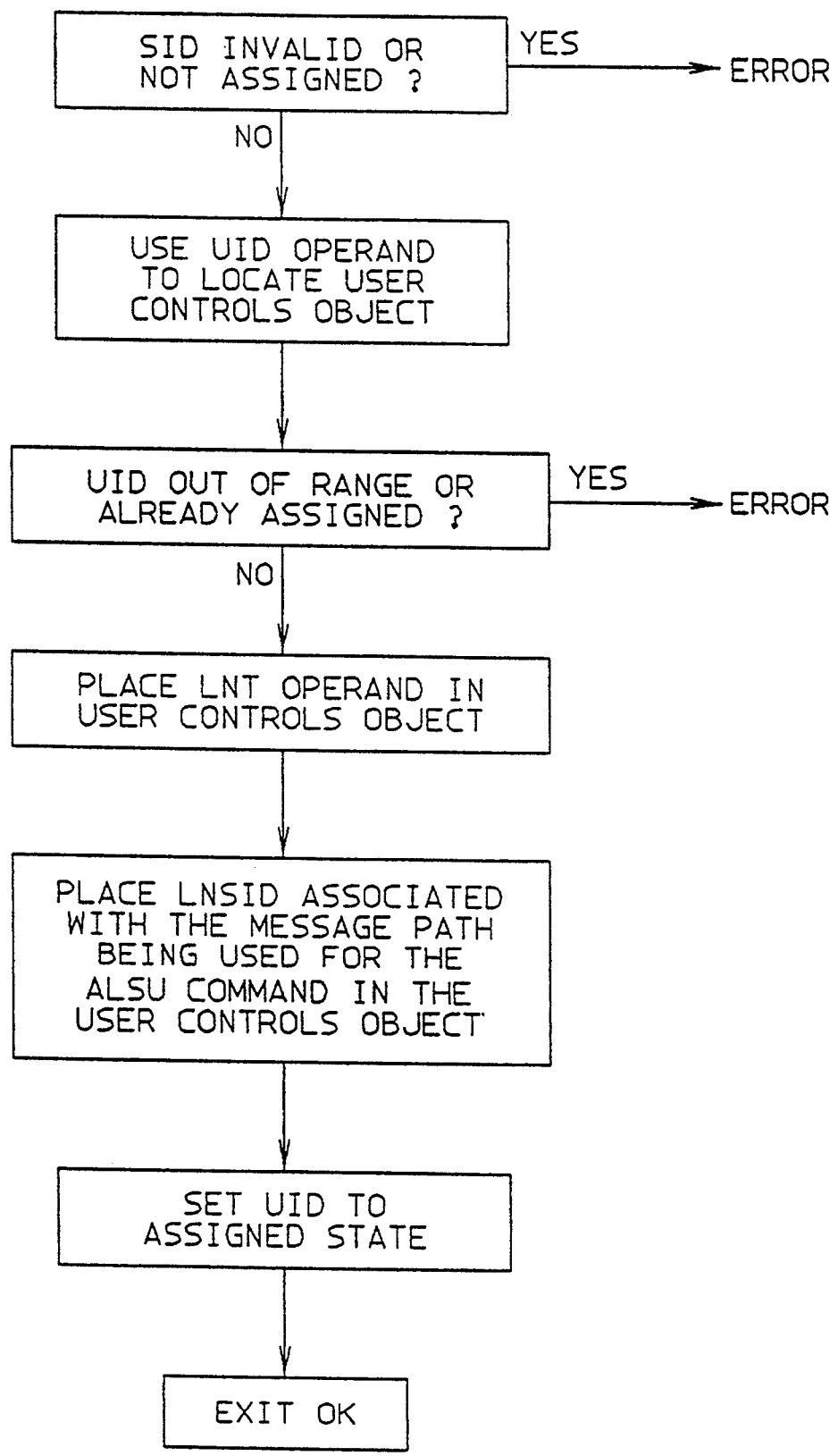
FIG. 14 is a flowchart illustrating the Attach List Structure User (ALSU) command.

FIG. 14 is a flowchart showing the process for the ALSU command.

The attach-list-structure-user command attaches the list-structure user.

When the list-structure user is attached, an indicative response code is returned in the response operand.

DLSU Command

The DLSU command completes the detachment process and changes the state of the user identifier 418 to unassigned.

Figure 15:
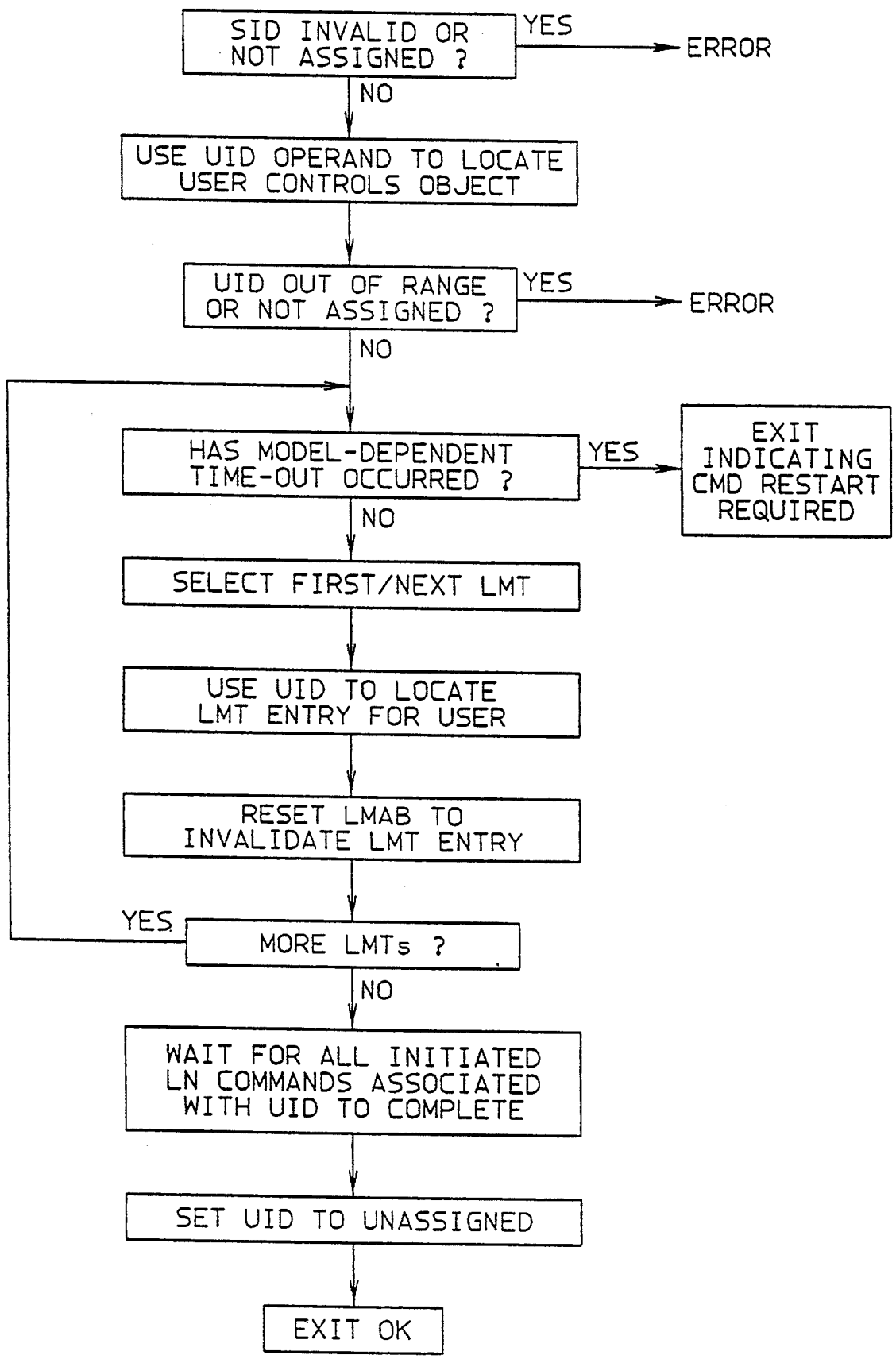
FIG. 15 is a flowchart illustrating the Detach List Structure User (DLSU) command.

FIG. 15 is a flowchart showing the process for the DLSU command.

The detach-list-structure-user command continues detaching the list-structure user.

The detach-list-structure-user command completes detaching the list-structure user when the list-monitoring-active bit of all the list-monitor-table entries associated with the list-structure user is reset. After processing all list monitor tables, the DLSU command waits for all initiated LN commands associated with the list structure user to complete 1501.

The user identifier is placed in the unassigned state.

When the list-structure user is detached, an indicative response code is returned in the response operand.

When the model-dependent time period has elapsed before the detachment process is complete, an indicative response code is returned in the response operand.

RLM Command

Figure 16:
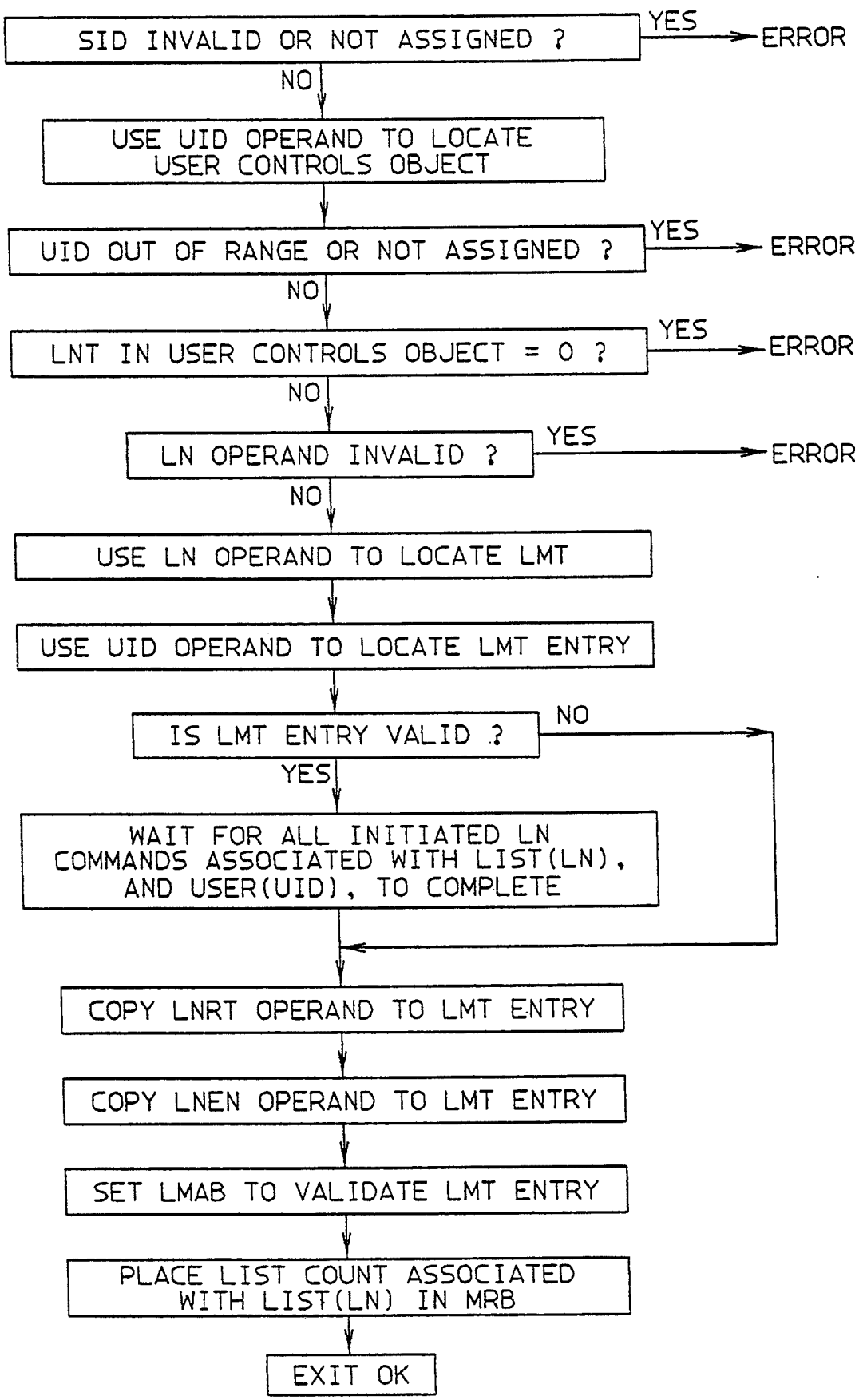
FIG. 16 is a flowchart illustrating the Register List Monitor (RLM) command.

The RLM command registers a list structure user as a list monitor by updating the list monitor table 316. It is described in FIG. 16.

When the specified list-structure user is attached with a valid list-notification token, the list-monitoring-active field is updated and the list-notification-request type and list-notification entry number are updated in the list-monitor-table entry of the specified list and user, and the list-entry count or the list-element count and an indicative response code are returned in the response operands.

When the specified list-structure user is attached with an invalid list-notification token, an indicative response code is returned in the response operand.

DLM Command

Figure 17:
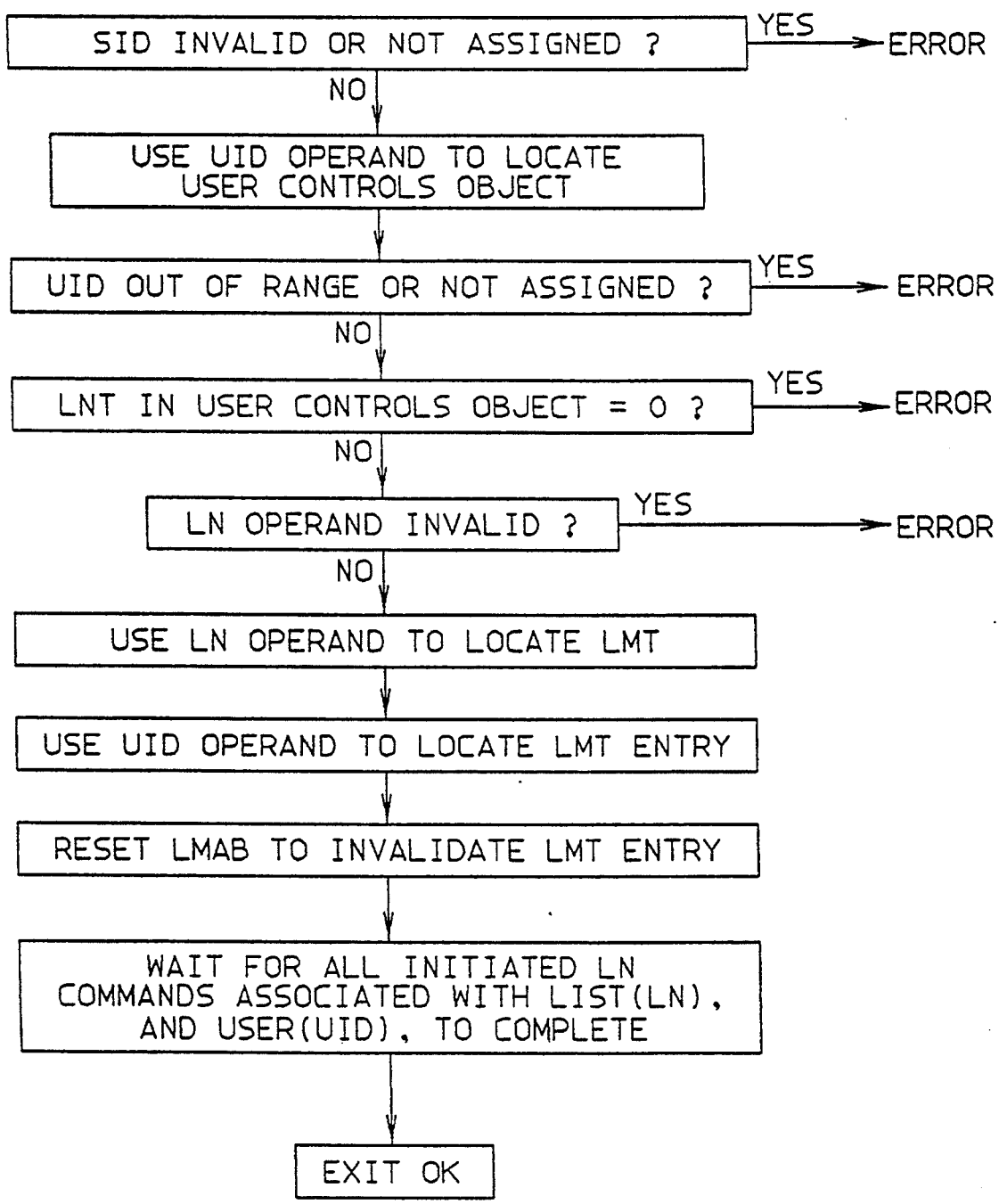
FIG. 17 is a flowchart illustrating the Deregister List Monitor (DLM) command.

The DLM command deregisters a list structure user as a list monitor. It is described in FIG. 17.

The list-monitoring-active field is updated in the list-monitor-table entry of the specified list and user. Then the DLM command waits for all initiated LN commands associated with the list and user to complete 1701. An indicative response code is returned in the response operand.

RUC Command

The RUC command returns the user controls 210 in the response operands.

Lock-only commands

The lock-only commands are:
Read-lock-table-entry (RLTE),
Write-lock-table-entry (WLTE),
Read-next-lock-table-entry (RNLTE), and
Clear-lock-table (CLT).

RLTE Command

The RLTE command returns the lock-table-entry value of the lock-table-entry 206 specified by the structure identifier and lock-table-entry number.

The lock-table-entry value of the lock-table entry specified by the structure identifier and lock-table-entry number and an indicative response code are returned in the response operands.

WLTE Command

The WLTE command compares the global-lock managers 207 and conditionally replaces the global-lock managers, the local-lock managers 208 or both.

When a global-lock manager is replaced and there are no other local-lock managers or when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then an indicative response code is returned in the response operand.

When global-lock manager comparison fails, an indicative response code is returned in the response operand.

RNLTE Command

The RNLTE command conditionally reads the next nonzero lock-table entry 206.

The read-next-lock-table-entry command scans the lock-table entry starting at the lock-table-entry number specified and proceeds sequentially in ascending lock-table-entry number order until a nonzero entry or the end of the lock table is reached, or a model-dependent time period elapses.

When the end of the lock table is reached without encountering a nonzero entry, the last lock-table-entry number and an indicative response code are returned in the response operands.

When a model-dependent time period has elapsed before the end of the lock table is reached, an indicative response code is returned in the response operand.

When a nonzero lock table entry is reached, the lock-table-entry number, the lock-table-entry value, and response code 2 are returned in the response operands.

CLT Command

The CLT command zeros one or more lock-table entries 206.

The clear-lock-table command zeros the lock-table entries starting at the lock-table-entry number specified and proceeds sequentially in ascending lock-table-entry-number order until a model-dependent time period elapses or the end of the lock table is reached.

When the end of the lock table is reached before a model-dependent time period has elapsed, an indicative response code is returned in the response operand.

When a model-dependent time period has elapsed before the end of the lock table is reached, the lock-table-entry-number of the next entry in the sequence that has not been cleared and an indicative response code is returned in the response operand.

Single-list-entry commands

The single-list-entry commands are:
Read-list-entry (RLE),
Write-list-entry (WLE),
Move-list-entry (MLE),
Delete-list-entry (DLE),
Write-and-move-list-entry (WMLE),
Move-and-read-list-entry (MRLE),
Read-and-delete-list-entry (RDLE), RLE Command The RLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, returns the designated list-entry controls 315 and list entry values 306 and 309, and conditionally updates the retry buffer.

The list entry is located and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be read, all of these processes, when requested, must succeed. In order for a lock-table entry to be written, all of these processes except for local-lock manager comparison, when requested, must succeed.

The retry buffer is written, depending on the retry index.

When a list entry is read, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock mangers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated-list-entry controls and an indicative response code are returned in the response operands.

When the designated list entry exists but the requested list-number comparison fails, the designated-list-entry controls and an indicative response code of are returned in the response operands.

When the designated list entry does not exist, an indicative response code is returned in the response operand.

WLE Command

The WLE command conditionally compares the list numbers 305 and 423, compares the list-set-entry counts, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, replaces or creates the designated list entry 302, returns the designated list-entry controls 315, and conditionally updates the retry buffer.

The designated list entry or position is located and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written, these processes, when requested, must succeed. In order for a lock-table entry to be written, all of these processes except for local-lock manager comparison, when requested, must succeed.

When a list entry is created and a list-state transition results, the list monitors are notified. The list-notification command does not have to complete before the write-list-entry command completes.

The retry buffer is written, depending on the retry index.

When a list entry is written, the list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code of are returned in the response operands.

When the designated list entry does not exist, an indicative response code is returned in the response operand.

When the list-entry name already exists and list-entry creation is requested, an indicative response code is returned in the response operand.

MLE Command

The MLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The list entry and the designated target position are located, the list-entry counts or list-element counts are compared, and, when requested, the list numbers are compared, the version numbers are compared, the version number is updated, or the global-lock managers are compared, or any combination of the preceding processes is performed. When the global-lock managers are compared, the local-lock managers may be compared. In order for a list entry to be moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-list-entry command completes.

The retry buffer is written, depending on the retry index.

When a list entry is moved, the designated-list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

DLE Command

The DLE command conditionally compares the list numbers 305 and 423, compares the version numbers 304 and 421, conditionally replaces the version number 304 with 411, compares the global-lock managers 207 and 415, compares the local-lock managers 208 and 416, writes the lock-table entry 206, deletes the designated list entry 302, returns the designated list-entry controls 315, and conditionally updates the retry buffer.

The list entry is located and, when requested, the list numbers are compared, the version numbers are compared, or the global-lock managers are compared, or any combination of the preceding processes is performed. When the global-lock managers are compared, the local-lock managers may be compared. In order for a list entry to be deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the delete-list-entry command completes.

The retry buffer is written, depending on the retry index.

When a list entry is deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When the global-lock manager is replaced and there are one or more other local-lock managers, or when a local-lock manager is replaced with the same value, then the lock-table-entry value and an indicative response code are returned in the response operands.

When the global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

WMLE Command

The WMLE command conditionally compares the list numbers 305 and 423, compares the list-set-entry counts, compares the list-entry counts 301 and 303 or list-element-counts 312 and 313, creates or replaces a list entry 302, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry controls 315, and conditionally updates the retry buffer.

The designated list entry or position is located, and, when requested, the version number is updated, the global-lock managers are compared, or the list entry is replaced or created, or any combination of the preceding processes is performed. When the global-lock managers are compared, the local-lock managers may be compared. When list-entry creation is requested, the list-set-entry counts and the list-entry counts or list-element counts are compared. When list-entry replacement is requested, the list numbers and version numbers may be compared. When the global-lock managers are compared, the lock-table entry may be written. In order for a list entry to be written and moved, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the write-and-move-list-entry command completes.

The retry buffer is written, depending on the retry index.

When a list entry is written and moved, the list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit, or the list-element count matches or exceeds the list-element-count limit, an indicative response code is returned in the response operand.

When the list set is full and list-entry creation is requested, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

When the list-entry name already exists and list-entry creation is requested, an indicative response code is returned in the response operand.

MRLE Command

The MRLE command conditionally compares the list numbers 305 and 423, compares the list-entry counts 301 and 303 or list-element-counts 312 and 313, compares the version numbers 304 and 421, conditionally updates the version number 304 with 411, compares the global-lock managers 207 and 415, compares the local-lock managers 208 and 416, writes the lock-table entry 206, moves the designated list entry 302, returns the designated list-entry values 306 and 309, returns the designated list-entry controls 315, and conditionally updates the retry buffer.

The list entry and the designated target position are located, the list-entry counts or list-element counts are compared, and, when requested, the list numbers are compared, the version numbers are compared, the version numbers are updated, or the global-lock managers are compared, or any combination of the preceding processes is performed. When the global-lock managers are compared, the local-lock managers may be compared. In order for a list entry to be moved and read, these processes, when requested, must succeed. In order for a lock-table entry to be written, all of these processes except for local-lock manager comparison, when requested, must succeed.

When a list entry is moved and list-state transitions result, the list monitors are notified. The list-notification command does not have to complete before the move-and-read-list-entry command completes.

The retry buffer is written, depending on the retry index.

When a list entry is moved and read, the designated list-entry controls, the list-set-entry count, the target list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response code.

When a global-lock manager is replaced and there are one or more other local-lock managers, or when a local-lock manager is replaced with the same value, then the lock-table-entry value and an indicative response code are returned in the response operands.

When global-lock manager comparison fails, the lock-table-entry value and an indicative response code are returned in the response operands.

When the designated list entry exists but the requested version-number comparison fails, the designated list-entry controls and an indicative response code are returned in the response operands.

When the list-entry count matches or exceeds the list-entry-count limit or the list-element count matches or exceeds the list-element-count limit, an indicative response code is returned in the response operand.

When the designated list entry exists but the requested list-number comparison fails, the designated list-entry controls and an indicative response code are returned in the response operands.

When the designated list entry does not exist, an indicative response code is returned in the response operand.

RDLE Command

The RDLE command conditionally compares the list numbers 305 and 423, compares the version numbers 304 and 421, conditionally updates the version number 304 with 411, compares the global-lock managers 207 and 415, compares the local-lock managers 208 and 416, writes the lock-table entry 206, deletes the designated list entry 302, returns the designated list-entry values 306 and 309, returns the designated list-entry controls 315, and conditionally updates the retry buffer.

The list entry is located and, when requested, the list number is compared, the version numbers are compared, or the global-lock managers are compared, or any combination of the preceding processes is performed. When the global-lock managers are compared, the local-lock managers may be compared. In order for a list entry to be read and deleted, these processes, when requested, must succeed. In order for a lock-table entry to be written, all of these processes except for local-lock manager comparison, when requested, must succeed.

When a list entry is deleted and a list-state transition results, the list monitors are notified. The list-notification command does not have to complete before the read-and-delete-list-entry command completes.

The retry buffer is written, depending on the retry index.

When a list entry is read and deleted, the designated-list-entry controls, the list-set-entry count, the list-entry count or list-element count, and an indicative response code are returned in the response operands.

When a global-lock manager is replaced and there are no other local-lock managers, when a local-lock manager is replaced with the opposite value, or when the global-lock and the local-lock managers are replaced, an indicative response code is returned in the response operand.

When a global-lock manager is replaced and there are one or more other local-lock managers, or when a local-lock manager is replaced with the same value, then the lock-table-entry value and an indicative response code are returned in the response operand.

When a global-lock manager comparison fails, the lock-table-entry value and an indicative response code are returned in the response operands.

When the designated list entry exists but the requested version-number comparison fails, the designated list-entry controls and an indicative response code are returned in the response operands.

When the designated list entry exists but the requested list-number comparison fails, the designated list-entry controls and an indicative response code are returned in the response operands.

When the designated list entry does not exist, an indicative response code is returned in the response operand.

Multiple-list-entry commands

The multiple-list-entry commands are:
Read-list (RL),
Read-list-set (RLS),
Delete-list-set (DLS), and
Delete-list-entries (DLES).

RL Command

The RL command conditionally compares the list numbers 305 and 423, and the version numbers 304 and 421. It returns the read-list entries count, the list-entry controls 315 of the next list entry 302, zero or more list-entry values 306 and 309, zero or more list-entry controls 315, or any combination of the preceding.

Figure 18:
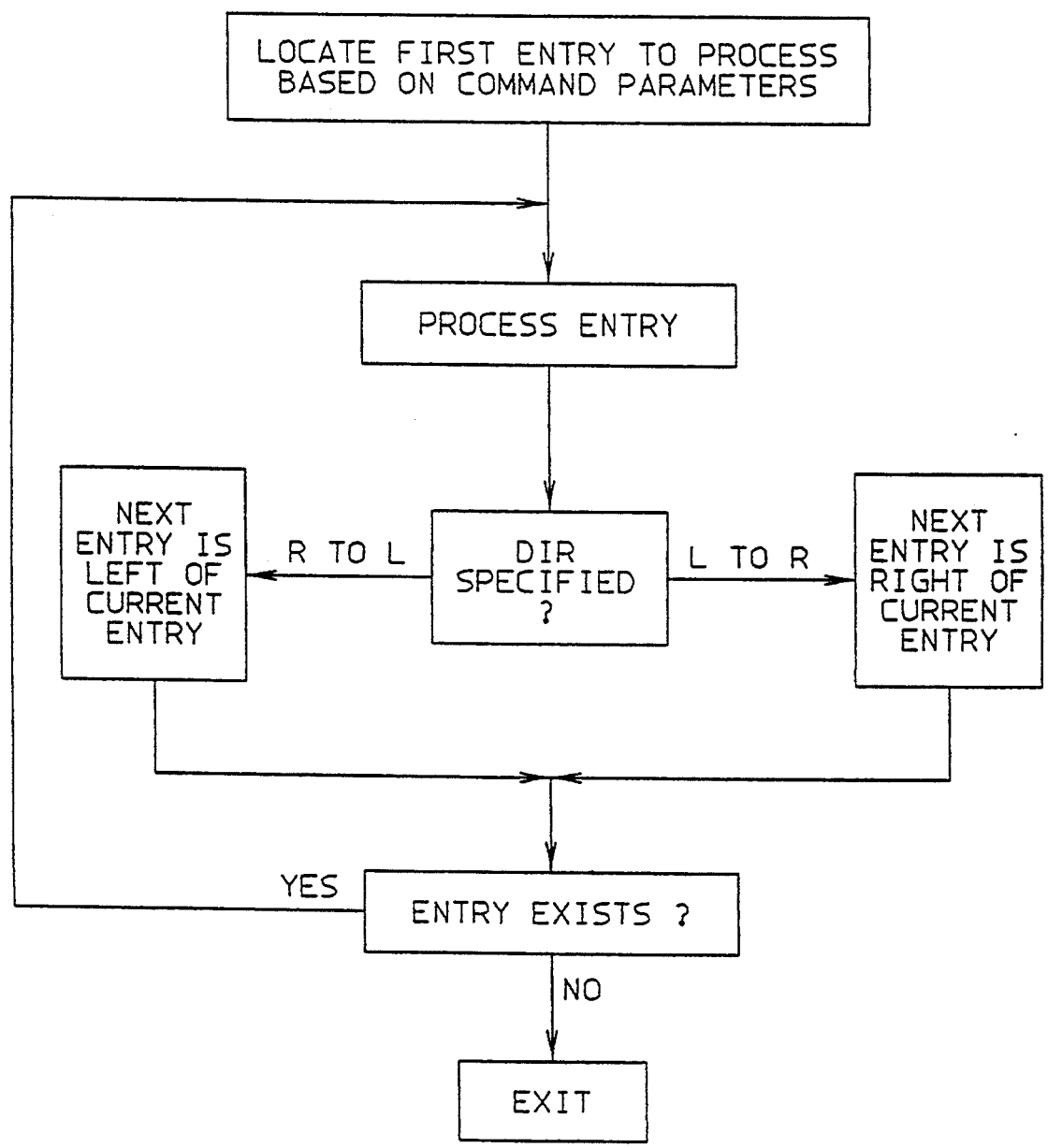
FIG. 18 is a flowchart illustrating the process of scanning for list entries by direction, for multiple list entry commands.

When requested, the list numbers are compared before the first list entry is scanned. (The scanning process is illustrated in FIG. 18.) The list entries are scanned starting at the designated position and proceeding in the direction specified until a model-dependent time period elapses, the data area is filled, or the last list entry is scanned. Each list entry is located and, when requested, the version numbers are compared. In order for any list entries or list-entry controls to be read, the list-number comparison, when requested, must succeed. In order for a particular list entry or list-entry controls to be read, the version-number comparison, when requested, must succeed.

The list-entry controls and adjunct list entry for the first list entry scanned are placed in the message-response block. The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the list-entry controls of the next list entry in the sequence to be scanned and an indicative response code are returned in the response operands.

When the specified data-block size is not large enough to contain the information specified by the read-list type for at least one list entry, an indicative response code is returned in the response operand.

When the designated list entry exists but the requested list-number comparison fails, the designated-list-entry controls and an indicative response code are returned in the response operands.

When the designated list entry does not exist, an indicative response code is returned in the response operand.

RLS Command

The RLS command conditionally compares the list numbers 305 and 423 and the version numbers 304 and 421. It returns the read-list entries count, the restart token, zero or more list-entry values 306 and 309, zero or more list-entry controls 315, or any combination of the preceding.

The list entries within the list set are scanned starting at the restart token specified until a model-dependent time period elapses, the data area is filled, or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry or list-entry controls to be read, the version-number comparison and list-number comparison, when requested, must succeed.

The list-entry controls and adjunct list entry for the first list entry scanned are placed in the Message Response Block (MRB). The data list entry for the first list entry and all subsequent list-entry controls, adjunct list entries and data list entries are placed in the data block.

When the last list entry is scanned, the read-list-entries count equaling the number of data or adjunct list entries or list-entry controls stored and an indicative response code are returned in the response operands.

When the data block is filled or a model-dependent time period has elapsed, then the read-list-entries count equalling the number of data or adjunct list entries or list-entry controls stored in the message-response block and data block, the restart token, and an indicative response code are returned in the response operands.

When the specified data block size is not large enough to contain the information specified by the read-list type for at least one list entry, an indicative response code is returned in the response operand.

When the restart token is invalid, an indicative response code is returned in the response operand.

DLS Command

The DLS command conditionally compares the list numbers 305 and 423 and the version numbers 304 and 421. It returns the delete-list entries count, and the restart token. It deletes zero or more list-entries 302.

The list entries within the list set are scanned starting at the restart token specified until a model-dependent time period elapses or the last list entry is scanned. A zero restart token starts the processing, and a nonzero token restarts the processing at the next list entry. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-set command completes.

When the last list entry is scanned, the delete-list-entries count equaling the number of list entries deleted and an indicative response code are returned in the response operands.

When a model-dependent time period has elapsed, the delete-list-entries count equaling the number of list entries deleted, the restart token, and response code 1 are returned in the response operands.

When the restart-token operand is invalid, an indicative response code is returned in the response operand.

DLES Command

The DLES command conditionally compares the list numbers 305 and 423 and the version numbers 304 and 421. It returns the delete-list entries count, and the current data index. It deletes zero or more list-entries 302.

The list entries within the list set are scanned starting at the first list entry specified by the starting data index and continuing in the same order as specified in the data block. Each list entry is located and, when requested, the version numbers are compared, or the list numbers are compared, or any combination of the preceding processes is performed. In order for a particular list entry to be deleted, the version-number comparison and list-number comparison, when requested, must succeed.

When a list entry is deleted and a list-state transition results, the list monitors are notified. The list-notification command does not have to complete before the delete-list-entries command completes.

When the last list entry specified by the ending data index is scanned, the delete-list-entries count equaling the number of list entries deleted and an indicative response code are returned in the response operands.

When a model-dependent time period has elapsed, the delete-list-entries count equaling the number of list entries deleted, the current data index of the next list entry to be scanned, and an indicative response code are returned in the response operands.

When the designated list entry does not exist, the delete-list-entries count equaling the number of list entries deleted, the current data index of the nonexistent list entry, and an indicative response code are returned in the response operands.

What is claimed is:

1. An apparatus for managing one or more list data structures each comprising one or more list entries, within a Structured External Storage (SES) facility in a data processing system, said apparatus comprising,
   (a) one or more Central Processor Complexes (CPC's) each comprising a processing unit and main storage, each said CPC capable of executing one or more user processes;
   (b) said Structured External Storage (SES) facility coupled to each of the one or more CPC's;
   (c) communication means for communicating List Function requests by one or more user processes between one of said one or more CPC's and said SES;
   (d) detection means in said SES, responsive to said list function requests, for detecting a state change for one of said one or more list data structures Caused by performance of said list function requests;
   (e) registration means in said SES for registering interest of one of said user processes, executing on a particular one of said one or more CPC's, in said state change for a set of said one or more list data structures by associating an identifier of of a first process of said one or more user processes with a notification field with each list data structure in said set and transmitting a registration message comprising a process identified, a list identifier, and a vector means entry identifier to a registration process in said SES;
   (f) means in said SES utilizing Said registration message for communicating said state change notification from said SES to said particular one of said one or more CPC's over said communication means, and means in said particular one of said one or more CPC's receiving said state change notification for directly updating said notification field to indicate that said state change has occurred.

2. The apparatus of claim 1 in which said means for communicating comprises:
   (a) list notification command means in said SES for initiating a notification of said state change to user who registered interest, by said registration means, said notification being sent to said particular one of said one or more CPC's over said communication means in response to said detecting by said detection means;
   (b) vector means in said particular one of said one or more CPC's for receiving, within said notification field, said notification of said state change from said SES when said user in said particular one of said one or more CPC's has registered interest in said set of lists by said registration means.

3. The apparatus of claim 2 in which said registration means comprises a directory within said SES comprising one or more state indicators each associated with an associated list in the list data structure, each of said one or more state indicators having a first value if said associated list has at least one list entry, and having a second value if said associated list is empty.

4. The apparatus of claim 3 in which said directory further comprises a list monitor table associated with each said associated list in said list structure, said list monitor table comprising a "monitoring active" entry indicating if monitoring is active for said user.

5. The apparatus of claim 4 in which said registration means further comprises register list monitor means for setting said "monitoring active" entry "on" on request of said user.

6. The apparatus of claim 4 in which said registration mean further comprises register list monitor means for setting said "monitoring active" entry "off" on request of said user.

7. The apparatus of claim 2 in which said vector means comprises a list notification vector comprising an entry associated with said one of the set of lists in which the user has registered interest.

8. The apparatus of claim 2 in which the state change is an empty-to-not-empty state change.

9. The apparatus of claim 2 in which the state change is a not-empty-to-empty state change.

10. The apparatus of claim 9 further comprising means for ensuring that no empty-to-not-empty state changes are initiated by said list notification command means until said notification of said not-empty-to-empty state change is completed.

11. The apparatus of claim 2 in which said registration means comprises an attach list structure command means for performing said associating.

12. The apparatus of claim 2 further comprising test means in said particular one of said one or more CPC's for testing status of an indicator in said vector means.

13. The apparatus of claim 12 in which said indicator comprises a summary indicator and a list notification entry (LNE) indicator associated with said set of lists in which said user has registered interest, said LNE indicator in a list notification vector (LNV) associated with said user, said summary indicator being set in conjunction with setting at least one said LNE indicator.

14. The apparatus of claim 13 in which said test means comprises Test Vector Summary means for testing said summary indicator, and Test Vector Entry means for testing said LNE indicator.

15. The apparatus of claim 14 in which said summary indicator further comprises a global summary indicator and a local summary indicator, said local summary indicator linked to said LNV.

16. The apparatus of claim 15 further comprising
   a) global summary exit means, responsive to a positive indication from said test means, when testing status of said global summary indicator, and operation to drive a local summary exit means when a test of said local summary indicator, by said test means, is positive;
   b) said local summary exit means, responsive to said global summary exit means, for driving a user exit means for responding to said state change by said user.

17. A computer implemented method for notification of a first data processing (DP) system, on which a first process is executing, that a list, comprising one or more list entries, in a list structure in a structured external storage (SES) unit has undergone s state transition because of performance of a list function on said list at request of a second process in a second DP system, said method comprising the steps of:
   (a) said first process registering interest in said state transition for said list in said SES by causing the association of an identifier of a said first user process with a notification field, within said first DP system, with said list; and transmitting a registration message comprising a process identified, a list identifier, and a vector means entry identifier to a registration process in said SES;
   (b) said second process initiating said list function on said list;

(c) detection means in said SES, initiate by said list function, detecting said state change caused by performance of said list function, utilizing said registration message for identifying said first process as having registered interest, and sending a notification to said first DP system;

(d) notification vector means in said first DP system receiving said notification from said detection means by updating said notification field by a direct update of said notification field to indicate said state change occurred.

18. The method of claim 17 further comprising the step of said first process periodically polling said notification vector means to determine whether said state transition has occurred.

19. The method of claim 17 in which said step of registering further comprises the step of said registration process, on receipt of said registration message, validating said process identified in a table linked to said list identifier.

20. The method of claim 19 in which said registration message further comprises a list notification vector summary update indication, in which said step of registering further comprises the step of said registration process, on receipt of said registration message having said list notification vector summary update indication, stores a "summary requested" indication in said table, and in which said notification vector means in said second DP system performs a step of updating said vector summary indicator on receiving said notification, responsive to said "summary requested" indication in said table.

21. The method of claim 20 further comprising the step of a test means within a control program of said first DP system periodically polling said summary update indication, and, when a positive response is received, performing a local summary process.

22. The method of claim 21 in which said step of performing a local summary process comprises the steps of polling said local summary update indication and, when a positive response is received, scheduling a process notification exit for notifying said first process that said state transition has occurred.

* * * * *